(12) United States Patent
Umemoto et al.

(10) Patent No.: US 7,633,584 B2
(45) Date of Patent: Dec. 15, 2009

(54) OPTICAL COMPENSATION PLATE, LIQUID CRYSTAL CELL, AND LIQUID CRYSTAL DISPLAY DEVICE

(75) Inventors: Seiji Umemoto, Ibaraki (JP); Hideo Abe, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 12/090,409

(22) PCT Filed: Sep. 12, 2006

(86) PCT No.: PCT/JP2006/318013
§ 371 (c)(1),
(2), (4) Date: Apr. 16, 2008

(87) PCT Pub. No.: WO2007/110980
PCT Pub. Date: Oct. 4, 2007

(65) Prior Publication Data
US 2009/0046229 A1    Feb. 19, 2009

(30) Foreign Application Priority Data
Mar. 24, 2006  (JP) ............................. 2006-083717
Apr. 28, 2006  (JP) ............................. 2006-125578

(51) Int. Cl.
*G02F 1/1335* (2006.01)
(52) U.S. Cl. ................... 349/117; 349/118; 349/119
(58) Field of Classification Search .......... 349/117–121
See application file for complete search history.

(56) References Cited

U.S. PATENT DOCUMENTS

| | | | | |
|---|---|---|---|---|
| 3,597,043 A | * | 8/1971 | Dreyer | 349/122 |
| 5,150,234 A | * | 9/1992 | Takahashi et al. | 349/1 |
| 5,539,545 A | * | 7/1996 | Shimizu et al. | 349/86 |
| 6,340,230 B1 | * | 1/2002 | Bryars et al. | 353/31 |
| 7,054,049 B2 | | 5/2006 | Murakami et al. | |
| 7,128,952 B2 | * | 10/2006 | Murakami et al. | 428/1.3 |
| 2005/0030456 A1 | | 2/2005 | Murakami et al. | |
| 2006/0209233 A1 | * | 9/2006 | Kawashima et al. | 349/106 |

FOREIGN PATENT DOCUMENTS

| | | |
|---|---|---|
| CN | 1623107 A | 6/2005 |
| JP | 2000-267076 A | 9/2000 |

(Continued)

OTHER PUBLICATIONS

International Search Report of PCT/JP2006/318013, date of mailing Dec. 19, 2006.

(Continued)

*Primary Examiner*—Michael H Caley
(74) *Attorney, Agent, or Firm*—Westerman, Hattori, Daniels & Adrian, LLP

(57) ABSTRACT

An optical compensation plate provided in a liquid crystal cell in which a distance of a liquid crystal layer is held through a spacer, in which the optical compensation plate is formed in such a way that a layer thickness becomes thin toward a central portion from an end portion. As the spacer, a spherical fine particle is employed. As a liquid crystal cell, a VA mode liquid crystal cell is employed. Since the optical compensation plate of the present invention has a thinner layer thickness in the central portion in response to a decrease in a cell gap in the central region of the liquid crystal cell, light leakage in the central region of the liquid crystal layer can be prevented well.

11 Claims, 10 Drawing Sheets

FOREIGN PATENT DOCUMENTS

| | | |
|---|---|---|
| JP | 2004-46065 A | 2/2004 |
| JP | 2006-072340 A | 3/2006 |
| KR | 2003-47172 A | 6/2003 |
| WO | 2005/015277 A1 | 2/2005 |

OTHER PUBLICATIONS

Korean Office Action dated Feb. 6, 2009 in corresponding Korean Patent Application No. 9-5-2009-005636892.

Office Action dated Jul. 24, 2009 in corresponding Chinese Patent Application 2006800347824.

* cited by examiner

OPTICAL COMPENSATION PLATE, LIQUID CRYSTAL CELL, AND LIQUID CRYSTAL DISPLAY DEVICE

BACKGROUND OF THE INVENTION

1. Field of the Invention

The present invention relates to an optical compensation plate for a liquid crystal cell in which a distance of a liquid crystal layer is held through a spacer, a liquid crystal cell provided with the optical compensation plate, and a liquid crystal display device.

2. Description of the Related Art

Hitherto, as a liquid crystal display device in a VA (vertical alignment) mode, for example a transmissive liquid crystal display device, a reflective liquid crystal display device, and a semi-transmissive reflective liquid crystal display device have been proposed in Japanese Unexamined Patent Publication Nos. 11-242226 and 2001-209065. As an application of the liquid crystal display device in the VA mode, a liquid crystal television can be exemplified. Generally, a liquid crystal cell of the liquid crystal display device is provided with two liquid crystal cell substrates, spacers interposed between the two substrates, and a liquid crystal material filled into a gap between the two substrates. In the liquid crystal cell, a thickness (cell gap) of a liquid crystal layer, in which the liquid crystal material is filled, is kept constant through a spacer.

This liquid crystal layer, in which the liquid crystal material is filled, itself has a birefringent property and a retardation. An optical compensation plate capable of canceling (compensating) the retardation of the liquid crystal layer is laminated on the liquid crystal cell for improving a viewing angle characteristic resulting from this retardation.

As the optical compensation plate, for example, a biaxial optical film having a relationship of nx>ny>nz is known. This optical compensation plate is a film formed by, for example, applying a non-liquid crystal material selected from polyamide, polyimide, polyester, polyetherketone, polyamide-imide, polyesterimide and the like onto a transparent film typified by triacetyl cellulose, as described for example in Japanese Unexamined Patent Publication No. 2004-46065.

This optical compensation plate is formed so as to have a uniform thickness, and laminated on and bonded to, for example, the backlight side of the liquid crystal cell substrate.

However, even when the retardation of the liquid crystal layer is compensated by laminating the above-mentioned optical compensation plate, light leakage may occur in a central region of the liquid crystal cell. If the light leakage occurs, there is a problem that in viewing a liquid crystal display surface in a black-display state from an angle, the black-display level is deteriorated. Particularly in a relatively large liquid crystal cell, reduction in the black-display level in a central region of the display surface is apt to occur.

SUMMARY OF THE INVENTION

It is an object of the present invention to provide an optical compensation plate which can compensate well a liquid crystal cell, particularly a large liquid crystal cell, to improve a viewing angle characteristic, a liquid crystal cell, and a liquid crystal display device.

The present inventors made earnest investigations concerning the above-mentioned problem, and consequently found that the problem results from partial change of the cell gap of the liquid crystal cell and therefore an optical compensation plate having a uniform thickness cannot compensate the whole area of the liquid crystal layer. These findings have now led to completion of the present invention.

That is, in the liquid crystal cell used in a liquid crystal display device, a cell gap is kept constant through a spacer as described above. Spacers are almost evenly located at the time when a liquid crystal cell is manufactured. However, if external bending stress is applied to the liquid crystal cell after production, spacers positioned in a central region of the liquid crystal cell move to the end side of the liquid crystal cell, or spacers positioned in the central region are deformed by compression or immersed in a color filter or the like. Consequently, the cell gap in the central region of the liquid crystal cell becomes thin (small). Particularly, changes in the cell gap in the central region are remarkable with upsizing of the liquid crystal display device. Although the cell gap in the central region of the liquid crystal cell thus changes to be thin, conventionally, an optical compensation plate that has the thickness with a high uniformity has been employed as the optical compensation plate provided for the liquid crystal cell. Therefore, the conventional optical compensation plate cannot adequately compensate the liquid crystal cell in which the cell gap in the central region has become thin, and this causes light leakage to occur.

The present invention has been made under the above-mentioned findings, and provides an optical compensation plate provided in a liquid crystal cell in which a distance of a liquid crystal layer is held through a spacer, which has a portion in which a layer thickness becomes thin toward a central portion from an end portion.

The above-mentioned optical compensation plate is attached to the liquid crystal cell in which the distance of a liquid crystal layer is held through a spacer before being used.

As described above, when external bending stress is applied to the liquid crystal cell in which a cell gap is held through a spacer, the cell gap becomes thin in a central region of the liquid crystal cell. Consequently, an absolute value of retardation of a liquid crystal layer is relatively small in the central region where the cell gap is thin. On the other hand, since the optical compensation plate of the present invention is formed in such a way that the layer thickness becomes thin toward a central portion from an end portion, the absolute value of retardation also becomes small in the central region of the optical compensation plate.

Thus, by providing the liquid crystal cell with the optical compensation plate having a central portion formed so as to be thinner in response to a decrease in the retardation in the central region of the liquid crystal cell, light exiting the central region of the liquid crystal layer can be compensated well.

The optical compensation plate of the present invention can prevent light leakage in the central region of the liquid crystal cell, and can prevent light leakage well particularly in the central region of a liquid crystal display device having a large screen to improve a viewing angle characteristic.

In addition, a preferred aspect of the present invention provides the optical compensation plate formed into a rectangular shape in which a layer thickness becomes thin toward a central portion from both end portions in a lateral direction.

Further, a preferred aspect of the present invention provides the optical compensation plate in which the spacer is composed of a fine particle which can move in the liquid crystal layer.

Further, a preferred aspect of the present invention provides the optical compensation plate exhibiting a relationship of nx>ny>nz, wherein nx, ny, and nz represent refractive indexes in the direction of an X-axis, a Y-axis and a Z-axis, respectively, and the X-axis is an axial direction in which the maximum refractive index is shown in a plane, the Y-axis is an axial direction perpendicular to the X-axis in the same plane, and the Z-axis represents a thickness direction perpendicular to the X-axis and the Y-axis.

In addition, a preferred aspect of the present invention provides the optical compensation plate obtained by coating a long substrate film successively with a birefringent material.

Further, a preferred embodiment of the present invention provides the optical compensation plate obtained by applying the birefringent material, and then cutting the long substrate film in a width direction in which a width is 600 to 1500 mm.

In addition, a preferred aspect of the present invention provides the optical compensation plate in which the birefringent material is a polymer solution including at least one species of polymer selected from polyamide, polyimide, polyester, polyetherketone, polyamide-imide and polyester-imide, and a solvent.

Further, a preferred aspect of the present invention provides the optical compensation plate in which the substrate film is a protective film of a polarizer.

In addition, the present invention provides a liquid crystal cell having the optical compensation plate. Preferably, the liquid crystal cell is in a VA (vertical alignment) mode.

Further, the present invention provides a liquid crystal display device having the liquid crystal cell having the optical compensation plate.

BRIEF DESCRIPTION OF THE DRAWINGS

FIG. 7A shows a state in which an actuator is not started, and FIG. 7B shows a state in which the actuator is started;

FIG. 9 shows a variation example of the die coater apparatus.

DETAILED DESCRIPTION OF THE PREFERRED EMBODIMENTS

Hereinafter, embodiments of the present invention will be described.

Figure 1A:
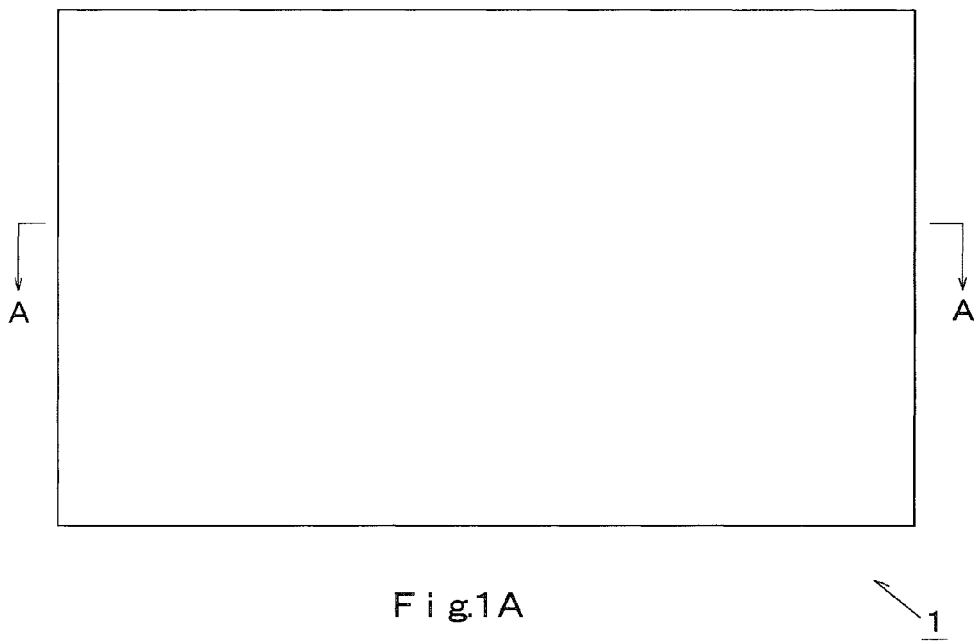
FIG. 1A is a front view showing an embodiment of a liquid crystal cell of the present invention.

As shown in FIG. 1A, a display surface of a liquid crystal cell 1 of the present invention is shaped like a rectangle in front view, for example. The liquid crystal cell 1 is formed in such a way that a length-to-width ratio of the display surface is, for example, about 3:4 to 10:16 to adapt to a liquid crystal television. A size of the display surface of the liquid crystal cell 1 is not particularly limited. However, since the optical compensation plate of the present invention is suitable for compensating a relatively large liquid crystal cell, the display surface of the liquid crystal cell 1 is preferably about 600 mm to 1500 mm wide.

Figure 1B:
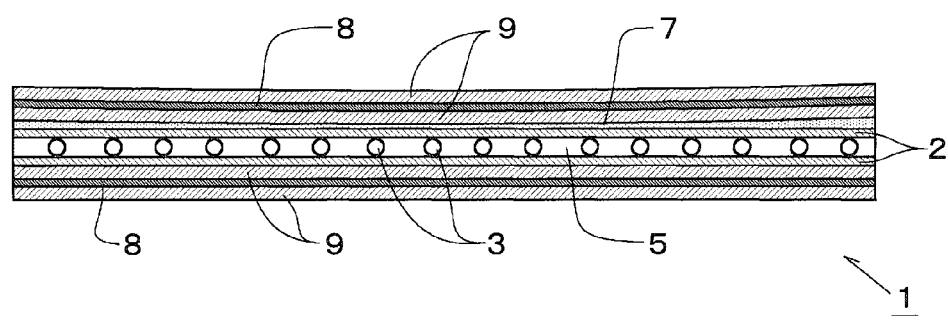
FIG. 1B is a sectional view taken on line A-A of FIG. 1A.

This the liquid crystal cell 1 includes, for example as shown in FIG. 1B, a pair of liquid crystal cell substrates 2, 2, spacers 3 interposed between the liquid crystal cell substrates 2, 2, a liquid crystal material (not shown) filled in a liquid crystal layer 5 formed between the pair of the liquid crystal cell substrates 2, 2, and an electrode element (not shown) such as a TFT substrate for driving the liquid crystal material provided on the inner surface side (liquid crystal layer side) of one liquid crystal cell substrate 2. The display surface of the liquid crystal cell 1 is shaped like a rectangle in which a width is longer than a length. An optical compensation plate 7 is provided on the outer surface side of the liquid crystal cell substrate 2 on the viewing side of this liquid crystal cell 1. In this optical compensation plate 7, a central portion is formed so as to have a thinner thickness. Polarizers 8 are provided on the outer surface of the optical compensation plate 7 and on the outer surface of the other liquid crystal cell substrate 2, respectively. On both sides of these polarizers 8, protective films 9, 9 are provided. Accordingly, the polarizers 8 are laminated on the outer surface of the optical compensation plate 7 and the outer surface of the other liquid crystal cell substrate 2 across the protective films 9.

The polarizer 8 and the protective film 9, 9 are formed in a uniform layer thickness. However, in FIG. 1B, the polarizer 8 and the protective film 9 provided on the viewing side are shown in a curve because the polarizer 8 and the protective film 9 are laminated on the optical compensation plate 7 in which the central portion is formed so as to have a thinner thickness.

Further, the protective film 9 and the polarizer 8 are not particularly limited, and as the protective film 9 and the polarizer 8, publicly known substances can be used. Specific examples of the protective film 9 include substances exemplified as a substrate film described later. Specific examples of the polarizer 8 are also described later. In addition, as the protective film 9, films subjected to, for example, a hard coat treatment, an anti-reflection treatment, and publicly known treatments aimed at preventing sticking, diffusing or antiglare can also be used.

As the liquid crystal cell 1 of the present invention, a constitution of a publicly known liquid crystal cell can be employed as long as it is a liquid crystal cell in which a distance of the liquid crystal layer 5 is held through the spacer 3. The liquid crystal cell of the present invention may have other constituents (not shown) publicly known such as a liquid crystal cell in which a color filter is provided on the liquid crystal cell substrate 2 on the viewing side, and a liquid crystal cell in which a rubbing alignment layer is provided on the liquid crystal layer 5 in addition to the above-mentioned constitution.

The liquid crystal cell substrate 2 is not particularly limited as long as it has high transparency. As the liquid crystal cell substrate 2, transparent flexible materials, for example, transparent glass plates such as soda-lime glass, low alkali borosilicate glass, alkali-free aluminoborosilicate glass and the like; and optical resin plates such as polycarbonate, polymethyl methacrylate, polyethylene terephthalate, epoxy resin and the like can be used.

The spacer 3 is provided to hold a cell gap of the liquid crystal layer 5. As the spacers 3, a spacer (also referred to as a bead spacer) formed by dispersing a fine particle in the liquid crystal layer 5, and a spacer (also referred to as a post spacer) formed by locating pillar bodies in the liquid crystal layer 5 are known. In the present invention, both spacers can be used. The former spacer 3 including a fine particle is not fixed to the liquid crystal cell substrate 2 and is a non-stationary spacer which can move in the liquid crystal layer 5. Therefore, in the liquid crystal cell 1 having the spacer 3, the cell gap in the central region tends to become thin by the application of bending stress. Accordingly, it is particularly effective to apply the optical compensation plate 7 of the present invention to the liquid crystal cell 1 employing the non-stationary spacer 3.

A material of the above-mentioned fine particle is not particularly limited, and a plastic particle, a silica particle and the like can be employed. A shape of the fine particle is also not particularly limited, and those having a publicly known shape such as a spherical, a cylindrical, a rectangular solid, a cubic, or a semi-spherical can be used. However, when a spherical fine particle or a cylindrical fine particle, as shown in the figures, is used as the spacer 3, the fine particle especially tends to move in the liquid crystal layer 5. Accordingly, it is particularly effective to apply the optical compensation plate 7 of the present invention to the liquid crystal cell 1 employing a spherical fine particle or a cylindrical fine particle as the spacer 3. A diameter of the fine particle is appropriately set in accordance with the thickness of the liquid crystal layer 5, and generally, a diameter of about 3 to 15 μm is employed. In addition, number of fine particles to be dispersed per unit area is not particularly limited. However, since too many fine particles cause a problem of disturbing the alignment of a liquid crystal material, generally, the number of fine particles to be dispersed is preferably about 100 to 300 pcs. per 1 square millimeters.

As the spacer (post spacer) formed by locating a pillar body in the liquid crystal layer, for example, a spacer, one end face of which is fixed to the one liquid crystal cell substrate, can be exemplified. This spacer can be formed, for example, by a method in which a photosensitive resin material is applied and a pillar body is formed on a black matrix of a color filter by a photolithography process.

A publicly known liquid crystal material is filled in the liquid crystal layer in which non-stationary spacers are provided. The liquid crystal material is not particularly limited, but it is preferred from the viewpoint of high contrast to use a liquid crystal material in a VA (vertical alignment) mode in which the liquid crystal material is aligned almost perpendicularly to the liquid crystal cell substrate during a no-voltage time. A liquid crystal cell in which such liquid crystal material is filled is generally referred to as a VA mode liquid crystal.

Next, the optical compensation plate 7 of the present invention will be described.

The optical compensation plate 7 is mainly used for canceling the retardation of a liquid crystal layer and composed of a birefringence layer exhibiting a prescribed retardation.

Figure 2A:
FIG. 2A is a front view showing an embodiment of an optical compensation plate of the present invention.
Figure 2B:
FIG. 2B is a sectional view taken on line B-B of FIG. 2A.

As shown in FIG. 2B, the optical compensation plate 7 has a portion in which a layer thickness becomes thin toward a central portion from an end portion. The optical compensation plate 7 includes at least a compensation plate formed so as to have a thinner central portion than a peripheral portion or a thinner central portion than both end portions in a lateral direction.

In the example shown in FIG. 2A, the optical compensation plate 7 is shaped like a rectangle of nearly identical shape and size with a display surface of the liquid crystal cell 1 in front view. The optical compensation plate 7 is formed so as to have a thickness distribution which becomes thin toward a central portion from both end portions in a lateral direction. Accordingly, as shown in the figure, one surface of the optical compensation plate 7 is formed in the form of a side of a cylinder (at least one edge in a thickness direction is arc-shaped).

The optical compensation plate 7 may be constructed from a birefringence layer of one layer or a laminated body formed by laying two or more birefringence layers one on top of another. In addition, the optical compensation plate 7 may be provided between the protective film 9 and the polarizer 8.

Figure 3A:
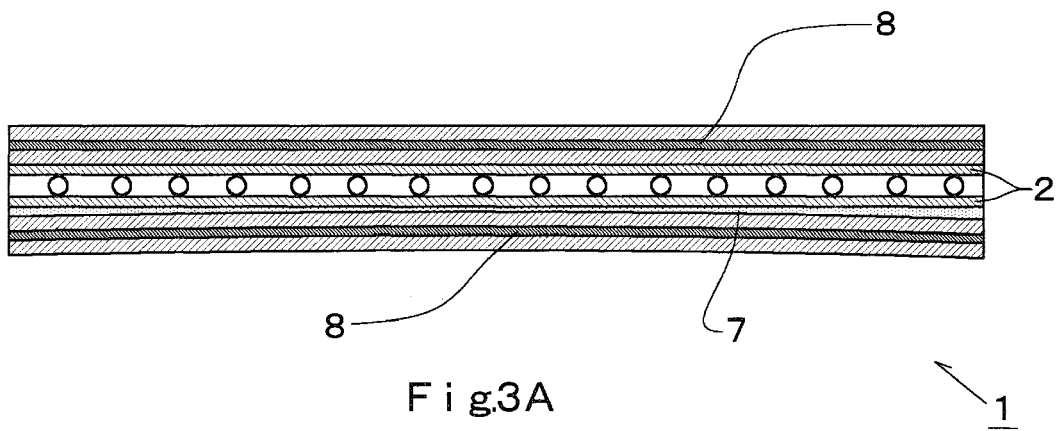
FIGS. 3A and 3B are sectional views showing another embodiment of the liquid crystal cell of the present invention.
Figure 3B:
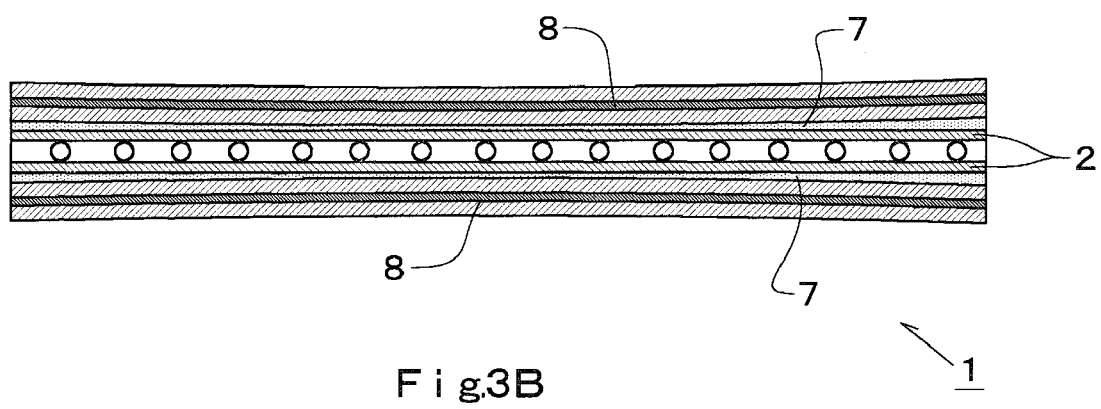

The optical compensation plate 7 is provided on the viewing side of the liquid crystal cell 1, as shown in FIG. 1B, but arrangement of the optical compensation plate 7 is not limited to this. For example, as shown in FIG. 3A, the optical compensation plate 7 may be provided on the side (backlight side) opposite to the viewing side of the liquid crystal cell 1. Further, as shown in FIG. 3B, the optical compensation plate 7 may be provided on both sides of the liquid crystal cell 1.

A thickness of the optical compensation plate 7 is appropriately set in consideration of materials composing the optical compensation plate 7 and the retardation of the liquid crystal layer 5. The thickness at an end of the optical compensation plate 7 is preferably set at 1 to 40 μm, more preferably set at 2 to 30 μm, and furthermore preferably set at 2 to 15 μm from the viewpoint of realizing a low-profile liquid crystal display device.

Further, the thickness at a central portion of the optical compensation plate 7 is not particularly limited. The reason for this is that the thickness at a central portion is to be appropriately set in response to the extent to which the cell gap in the central region of the liquid crystal layer 5 becomes thin due to the movement of the spacer 3. However, it is unlikely that the cell gap in the central region of the liquid crystal layer 5 changes extremely thin compared with the cell gap in the end portion of the liquid crystal layer 5. Therefore, it is preferred that the thickness in the central portion of the optical compensation plate 7 is generally set so as to be 0.6 times to 0.95 times larger than the thickness at an end portion, more preferably 0.7 times to 0.9 times, and furthermore preferably 0.75 times to 0.9 times.

In the above-mentioned liquid crystal cell 1, a cell gap is held through the spacer 3. However, since bending stress is applied to the liquid crystal cell 1 after production and thereby the spacers 3 in the central region of the liquid crystal cell 1 move or are deformed by compression, the cell gap in the central region of the liquid crystal cell 1 becomes thin. Particularly, in a liquid crystal cell 1 having a relatively large rectangular display surface of about 600 mm to 1500 mm wide, the cell gap in the central region in a lateral direction tends to become thin compared with those in both end portions in a lateral direction.

When the cell gap thus changes, an absolute value of retardation of the liquid crystal layer 5 becomes large at the end side and becomes small in the central region. Therefore, a retardation distribution becomes nonuniform in the respective region of one liquid crystal layer.

In the present invention, the optical compensation plate 7 provided in such liquid crystal cell 1 is formed in such a way that the layer thickness becomes thin toward a central portion from an end portion. Therefore, the absolute value of retardation of the optical compensation plate 7 becomes small toward the central portion.

Accordingly, even when the absolute value of retardation (particularly retardation in a thickness direction) in the central region of the liquid crystal cell 1 becomes small due to changes in the cell gaps, it is possible to compensate the central region of the liquid crystal cell 1 well to prevent light leakage by providing an optical compensation plate 7 having a central portion formed thinner.

Incidentally, the cell gap on the end side of the liquid crystal cell 1 does not substantially change, the end side of the liquid crystal cell 1 can also be compensated well by the above-mentioned optical compensation plate 7.

Thus, the optical compensation plate 7 of the present invention has a thinner central portion formed in response to a decrease in the retardation in the central region of the liquid crystal cell 1, it can compensate the whole area of the liquid crystal layer 5 well. The liquid crystal cell 1 and the liquid crystal display device, provided with the optical compensation plate 7, are superior in a viewing angle characteristic.

In addition, the optical compensation plate 7 is formed in such a way that the layer thickness becomes thin gradually toward a central portion from an end portion. Therefore, there is no possibility that streaked patterns appear on a display surface in displaying images on a liquid crystal display device.

As the above-mentioned optical compensation plate 7, one exhibiting an optical property of nx>ny>nz or nx≈ny>nz is preferred. Herein, nx, ny, and nz represent refractive indexes of an X-axis, a Y-axis and a Z-axis, respectively, in the optical compensation plate, and the X-axis is an axial direction in which the maximum refractive index is shown in a plane of the compensation plate, the Y-axis is an axial direction perpendicular to the X-axis in the same plane, and the Z-axis represents a thickness direction perpendicular to the X-axis and the Y-axis.

By locating the optical compensation plate exhibiting the above-mentioned optically biaxial property of nx>ny>nz between the liquid crystal cell of the liquid crystal display device and the polarizer, the viewing angle of the liquid crystal display device can be widened.

Further, the optical compensation plate exhibiting an optically uniaxial property of nx≈ny>nz is useful, for example, for compensating a VA (vertical alignment) mode liquid crystal layer.

A material for forming the optical compensation plate is not particularly limited and conventionally known materials can be employed. In addition, as criteria by which the material for forming the optical compensation plate is selected, it is preferred to select, for example, a material, in which the birefringence in forming the optical compensation plate becomes relatively high.

The material for forming the optical compensation plate is preferably, for example, a non-liquid crystal material, particularly a non-liquid crystal polymer. Such non-liquid crystal material forms, for example, a film exhibiting an optically uniaxial property of nx>nz or ny>nz by nature of the non-liquid crystal polymer itself as distinct from the liquid crystal material. Therefore, for example, a substrate to be used in preparing the optical compensation plate is not limited to an aligned substrate to be used in the case of the liquid crystal material. That is, as a substrate in preparing the optical compensation plate using the non-liquid crystal polymer, for example, a not-yet-aligned substrate can be employed, and even when the not-yet-aligned substrate is used, the step of applying or laminating an alignment layer onto the surface of the substrate can be omitted.

As the above-mentioned non-liquid crystal polymer, for example, polymers such as polyamide, polyimide, polyester, polyetherketone, polyamide-imide and polyesterimide are preferred since these polymers are superior in heat resistance, chemical resistance, and transparency and rich in rigidity.

Any one species of these polymers may be used alone. These polymers may be used as a mixture of two or more species having different functional groups, such as a mixture of polyaryletherketone and polyamide. Among such polymers, polyimide is particularly preferred since it has high transparency, a high aligning property, and a high stretching property.

A molecular weight of the above-mentioned polymer is not particularly limited, but for example, a weight average molecular weight (Mw) is preferably in a range of 1000 to 1000000, and more preferably in a range of 2000 to 500000.

As the polyimide, for example, polyimide which has a high in-plane aligning property and is soluble in an organic solvent is preferred. Specifically, for example, a polymer disclosed in Japanese Unexamined Patent Publication No. 2000-511296, which includes a polycondensation product of 9,9-bis(aminoaryl)fluorene and aromatic tetracarboxylic dianhydride and includes one or more repeat units expressed by the following formula (1):

[chemical formula 1]

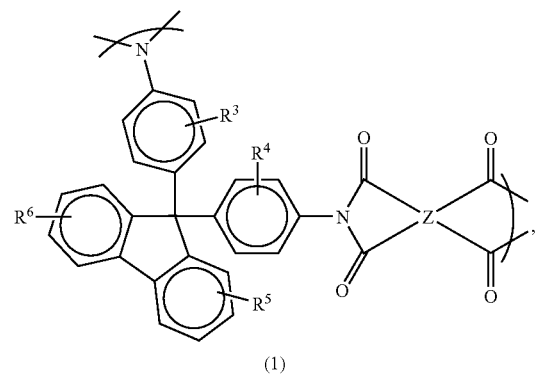

(1)

can be used.

In the formula (1), each of groups of $R^3$ to $R^6$ is at least one species of a substituent selected independently from the group consisting of hydrogen, halogen, a phenyl group, a phenyl group substituted by 1 to 4 halogen atoms or a $C_1$ to $C_{10}$ alkyl group, and a $C_1$ to $C_{10}$ alkyl group. Each of groups of $R^3$ to $R^6$ is preferably at least one species of a substituent selected independently from the group consisting of halogen, a phenyl group, a phenyl group substituted by 1 to 4 halogen atoms or a $C_1$ to $C_{10}$ alkyl group, and a $C_1$ to $C_{10}$ alkyl group.

In the formula (1), Z is, for example, a tetravalent $C_6$ to $C_{20}$ aromatic group, and preferably a pyromellitic group, a polycyclic aromatic group, a derivative of a polycyclic aromatic group, or a group expressed by the following formula (2):

[chemical formula 2]

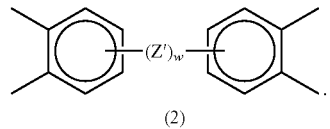

(2)

In the formula (2), Z' is, for example, a covalent bond, a $C(R^7)_2$ group, a CO group, an oxygen (O) atom, a sulfur (S) atom, an $SO_2$ group, an $Si(C_2H_5)_2$ group, or an $NR^8$ group, and when number of Z's is two or more, these Z's are the same or different. In addition, w represents an integer of 1 to 10. $R^7$ is independently hydrogen or a $C(R^9)_3$. $R^8$ is hydrogen, an alkyl group having 1 to about 20 carbon atoms, or a $C_6$ to $C_{20}$ aryl group, and when number of $R^8$s is two or more, these $R^8$s are the same or different. $R^9$s are independently hydrogen, fluorine, or chlorine.

Examples of the polycyclic aromatic group include, for example, a tetravalent group derived from naphthalene, fluorene, benzofluorene, or anthracene. In addition, examples of a substituted derivative of the foregoing polycyclic aromatic group include a polycyclic aromatic group substituted by at least a group selected from the group consisting of a $C_1$ to $C_{10}$ alkyl group, a fluorinated derivative thereof and halogen (fluorine, chlorine, or the like).

In addition to these, examples of the polycyclic aromatic group include a homopolymer having a repeat unit expressed by the following general formula (3) or (4), and polyimide having a repeat unit expressed by the following general formula (5), which are described in Japanese Unexamined Patent Publication No. 8-511812. In addition, the polyimide of the following formula (5) is a preferred form of the homopolymer of the following formula (3).

[chemical formula 3]

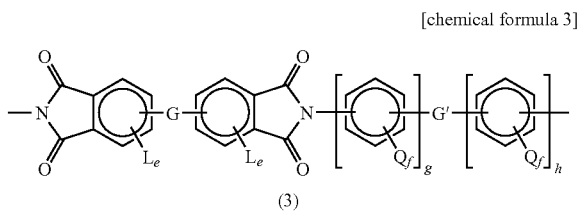

(3)

[chemical formula 4]

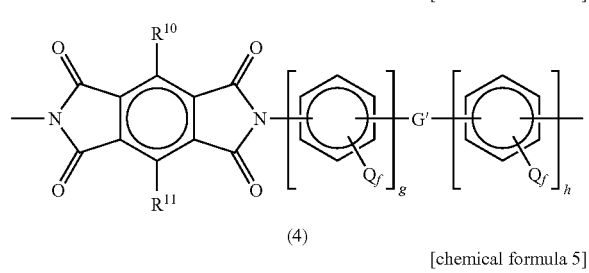

(4)

[chemical formula 5]

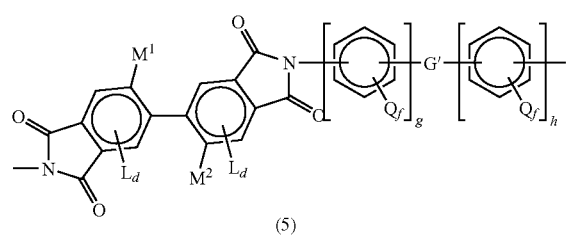

(5)

In the general formulas (3) to (5), G and G' represent, for example, a group, respectively, selected independently from the group consisting of a covalent bond, a $CH_2$ group, a $C(CH_3)_2$ group, a $C(CF_3)_2$ group, a $C(CX_3)_2$ group (X is halogen), a CO group, an oxygen (O) atom, a sulfur (S) atom, an $SO_2$ group, an $Si(CH_2CH_3)_2$ group and an $N(CH_3)$ group, and these G and G' may be the same or different.

In the formulas (3) and (5), L is a substituent and its subscripts d and e represent the number of the substituents. The substituent L is, for example, halogen, a $C_1$ to $C_3$ alkyl group, a $C_1$ to $C_3$ halogenated alkyl group, a phenyl group, or a substituted phenyl group, and when number of the substituent Ls is two or more, these Ls are the same or different. Example of the foregoing substituted phenyl group include a substituted phenyl group having at least one species of a substituent selected from the group consisting of halogen, a $C_1$ to $C_3$ alkyl group, and a $C_1$ to $C_3$ halogenated alkyl group. In addition, examples of the foregoing halogen include fluorine, chlorine, bromine, and iodine. The subscript d is an integer of 0 to 2, and the subscript e is an integer of 0 to 3.

In the formulas (3) to (5), Q is a substituent and its subscript f represents the number of the substituent. The substituent Q is, for example, an atom or a group selected from the group consisting of hydrogen, halogen, an alkyl group, a substituted alkyl group, a nitro group, a cyano group, a thioalkyl group, an alkoxy group, an aryl group, a substituted aryl group, an alkylester group and a substituted alkylester group, and when number of the substituent Qs is two or more, these Qs are the same or different. Examples of the foregoing halogen include fluorine, chlorine, bromine, and iodine. Examples of the foregoing substituted alkyl group include a halogenated alkyl group. In addition, examples of the foregoing substituted aryl group include a halogenated aryl group. The subscript f is an integer of 0 to 4, the subscript g is an integer of 0 to 3, and the subscript h is an integer of 1 to 3. In addition, the subscript g and h are preferably larger than 1.

In the formula (4), each of groups of $R^{10}$ and $R^{11}$ is a substituent selected independently from the group consisting of hydrogen, halogen, a phenyl group, a substituted phenyl group, an alkyl group, and a substituted alkyl group. Among these groups, preferably, each of groups of $R^{10}$ and $R^{11}$ is independently a halogenated alkyl group.

In the formula (5), $M^1$ and $M^2$ are the same or different, and they are, for example, halogen, a $C_1$ to $C_3$ alkyl group, a $C_1$ to $C_3$ halogenated alkyl group, a phenyl group, or a substituted phenyl group. Examples of the foregoing halogen include fluorine, chlorine, bromine, and iodine. In addition, examples of the foregoing substituted phenyl group include a substituted phenyl group having at least one species of a substituent selected from the group consisting of halogen, a $C_1$ to $C_3$ alkyl group, and a $C_1$ to $C_3$ halogenated alkyl group.

Specific examples of polyimide expressed by the formula (3) include compounds having a repeat unit expressed by the following formula (6):

[chemical formula 6]

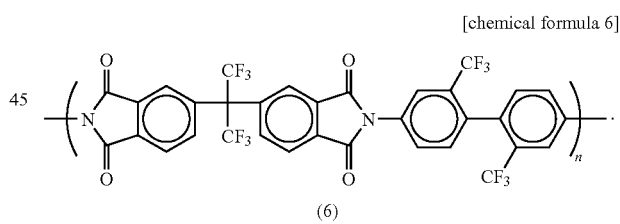

(6)

Furthermore, examples of the foregoing polyimide include copolymers formed by appropriately copolymerizing acid dianhydride or diamine other than the skeleton (repeat unit) described above.

Examples of the acid dianhydride include aromatic tetracarboxylic dianhydride. Examples of the aromatic tetracarboxylic dianhydride include pyromellitic dianhydride, benzophenonetetracarboxylic dianhydride, naphthalene tetracarboxylic dianhydride, heterocyclic aromatic tetracarboxylic dianhydride, and 2,2'-substituted biphenyltetracarboxylic dianhydride.

Examples of the pyromellitic dianhydride include pyromellitic dianhydride, 3,6-diphenylpyromellitic dianhydride, 3,6-bis(trifluoromethyl)pyromellitic dianhydride, 3,6-dibromopyromellitic dianhydride, and 3,6-dichloropyromellitic dianhydride. Examples of the benzophenonetetracarboxylic dianhydride include 3,3',4,4'-benzophenonetetracarboxylic dianhydride, 2,3,3',4'-benzophenonetetracarboxylic dianhydride, and 2,2',3,3'-benzophenonetetracarboxylic dianhydride. Examples of the naphthalene tetracarboxylic dianhydride include 2,3,6,7-naphthalene-tetracarboxylic dianhydride, 1,2,5,6-naphthalene-tetracarboxylic dianhydride, and 2,6-dichloro-naphthalene-1,4,5,8-tetracarboxylic dianhydride. Examples of the heterocyclic aromatic tetracarboxylic dianhydride include thiophene-2,3,4,5-tetracarboxylic dianhydride, pyrazine-2,3,5,6-tetracarboxylic dianhydride, and pyridine-2,3,5,6-tetracarboxylic dianhydride. Examples of the 2,2'-substituted biphenyltetracarboxylic dianhydride include 2,2'-dibromo-4,4',5,5'-biphenyltetracarboxylic dianhydride, 2,2'-dichloro-4,4',5,5'-biphenyltetracarboxylic dianhydride, and 2,2'-bis(trifluoromethyl)-4,4',5,5'-biphenyltetracarboxylic dianhydride.

Further, other examples of the aromatic tetracarboxylic dianhydride include 3,3',4,4'-biphenyltetracarboxylic dianhydride, bis(2,3-dicarboxyphenyl)methane dianhydride, bis(2,5,6-trifluoro-3,4-dicarboxyphenyl)methane dianhydride, 2,2-bis(3,4-dicarboxyphenyl)-1,1,1,3,3,3-hexafluoropropane dianhydride, 4,4'-(3,4-dicarboxyphenyl)-2,2-diphenylpropane dianhydride, bis(3,4-dicarboxyphenyl)ether dianhydride, 4,4'-oxydiphthalic dianhydride, bis(3,4-dicarboxyphenyl)sulfonic dianhydride (3,3',4,4'-diphenylsulfone tetracarboxylic dianhydride), 4,4'-[4,4'-isopropylidene-di(p-phenyleneoxy)]bis(phthalic anhydride), N,N-(3,4-dicarboxyphenyl)-N-methylamine dianhydride, and bis(3,4-dicarboxyphenyl)diethylsilane dianhydride.

Among these, as the aromatic tetracarboxylic dianhydride, 2,2'-substituted biphenyltetracarboxylic dianhydride is preferred, more preferably 2,2'-bis(trihalomethyl)-4,4',5,5'-biphenyltetracarboxylic dianhydride, and furthermore preferably 2,2'-bis(trifluoromethyl)-4,4',5,5'-biphenyltetracarboxylic dianhydride.

Examples of the diamine include aromatic diamine. Specific examples of the aromatic diamine include benzene diamine, diaminobenzophenone, naphthalenediamine, and heterocyclic aromatic diamine.

Examples of the benzene diamine include diamines selected from the group consisting of benzene diamines such as o-, m- or p-phenylenediamine, 2,4-diaminotoluene, 1,4-diamino-2-methoxybenzene, 1,4-diamino-2-phenylbenzene and 1,3-diamino-4-chlorobenzene. Examples of the diaminobenzophenone include 2,2'-diaminobenzophenone and 3,3'-diaminobenzophenone. Examples of the naphthalenediamine include 1,8-diaminonaphthalene and 1,5-diaminonaphthalene. Examples of the heterocyclic aromatic diamine include 2,6-diaminopyridine, 2,4-diaminopyridine, and 2,4-diamino-S-triazine.

In addition, examples of the aromatic diamine include, in addition to the above-mentioned aromatic diamines, 4,4'-diaminobiphenyl, 4,4'-diaminodiphenylmethane, 4,4'-(9-fluorenylidene)-dianiline, 2,2'-bis(trifluoromethyl)-4,4'-diaminobiphenyl, 3,3'-dichloro-4,4'-diaminodiphenylmethane, 2,2'-dichloro-4,4'-diaminobiphenyl, 2,2',5,5'-tetrachlorobenzidine, 2,2-bis(4-aminophenoxyphenyl)propane, 2,2-bis(4-aminophenyl)propane, 2,2-bis(4-aminophenyl)-1,1,1,3,3,3-hexafluoropropane, 4,4'-diaminodiphenyl ether, 3,4'-diaminodiphenyl ether, 1,3-bis(3-aminophenoxy)benzene, 1,3-bis(4-aminophenoxy)benzene, 1,4-bis(4-aminophenoxy)benzene, 4,4'-bis(4-aminophenoxy)biphenyl, 4,4'-bis(3-aminophenoxy)biphenyl, 2,2-bis[4-(4-aminophenoxy)phenyl]propane, 2,2-bis[4-(4-aminophenoxy)phenyl]-1,1,1,3,3,3-hexafluoropropane, 4,4'-diaminodiphenyl thioether, and 4,4'-diaminodiphenyl sulfone.

Examples of the foregoing polyetherketone, a material for forming an optical compensation plate, include polyaryletherketone described in Japanese Unexamined Patent Publication No. 2001-49110, which is expressed by the following general formula (7):

[chemical formula 7]

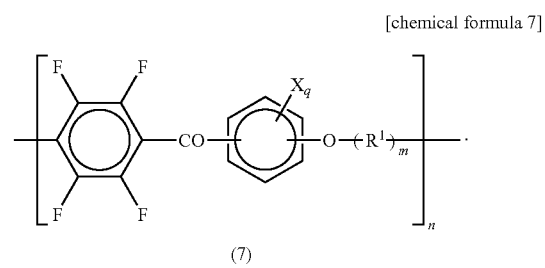

(7)

In the formula (7), X represents a substituent and its subscript q represents the number of the substituents. The substituent X is, for example, a halogen atom, a lower alkyl group, a halogenated alkyl group, a lower alkoxy group, or a halogenated alkoxy group, and when number of the substituent Xs is two or more, these Xs are the same or different.

Examples of the foregoing halogen atom include a fluorine atom, a bromine atom, a chlorine atom and an iodine atom, and among these halogen atoms, the fluorine atom is preferred. As the foregoing lower alkyl group, for example, $C_1$ to $C_6$ lower alkyl groups having a straight chain or branched chain are preferred, and $C_1$ to $C_4$ lower alkyl groups having a straight chain or branched chain are more preferred. As the lower alkyl group, specifically, a methyl group, an ethyl group, a propyl group, an isopropyl group, a butyl group, an isobutyl group, a sec-butyl group, and a tert-butyl group are preferred, and a methyl group and an ethyl group are particularly preferred. Examples of the foregoing halogenated alkyl group include halides of the foregoing lower alkyl group, such as a trifluoromethyl group. As the foregoing lower alkoxy group, for example, $C_1$ to $C_6$ alkoxy groups of a straight chain or branched chain are preferred, and $C_1$ to $C_4$ alkoxy groups of a straight chain or branched chain are more preferred. As the lower alkoxy group, specifically, a methoxy group, an ethoxy group, a propoxy group, an isopropoxy group, a butoxy group, an isobutoxy group, a sec-butoxy group, and a tert-butoxy group are preferred, and a methoxy group and an ethoxy group are particularly preferred. Examples of the foregoing halogenated alkoxy group include halides of the foregoing lower alkoxy group, such as a trifluoromethoxy group.

In the formula (7), the subscript q is an integer of 0 to 4. In the formula (7), polyaryletherketone, in which the subscript q is 0 and a carbonyl group and an oxygen atom of ether, bonded to both ends of a benzene ring, exist at a para position, respectively, is preferred.

In addition, in the formula (7), $R^1$ is a group expressed by the following formula (8), and the subscript m in the formula (7) is an integer of 0 or 1.

[chemical formula 8]

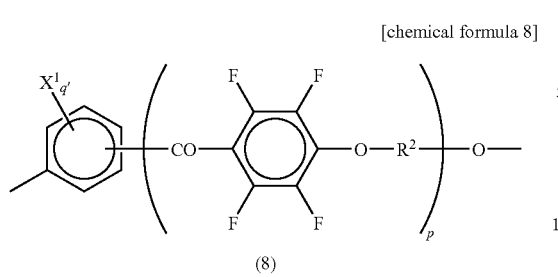

(8)

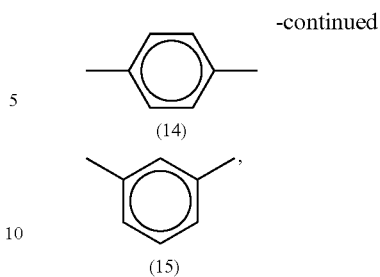

(14)

(15)

In the formula (8), X' represents a substituent and is similar to, for example, the X in the formula (7). In the formula (8), when number of the substituent X's is two or more, these X's are the same or different. The subscript q' represents the number of the foregoing substituents X', and is an integer of 0 to 4 and preferably 0. In addition, the subscript p is an integer of 0 or 1.

In the formula (8), $R^2$ represents a bivalent aromatic group. Examples of the bivalent aromatic group include an o- or m- or p-phenylene group; bivalent groups derived from naphthalene, biphenyl, anthracene, o- or m- or p-terphenyl, phenanthrene, dibenzofuran, biphenylether and biphenylsulfone; and the like. In these bivalent aromatic groups, hydrogen directly bonded to the aromatic may be replaced with a halogen atom, a lower alkyl group or a lower alkoxy group. Among these, an aromatic group selected from the group consisting of the following formulas (9) to (15):

[chemical formula 9 to 15]

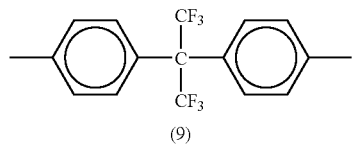

(9)

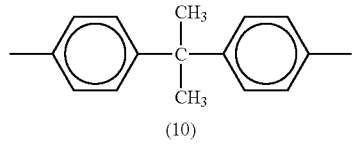

(10)

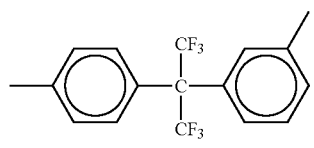

(11)

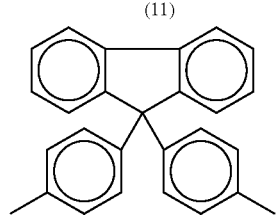

(12)

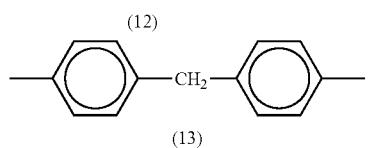

(13)

is preferred as an $R^2$ group.

In addition, in the above formula (7), as the group $R^1$, a group expressed by the following formula (16) is preferred, and in the following formula (16), $R^2$ and p are identical to those of the foregoing formula (8).

[chemical formula 16]

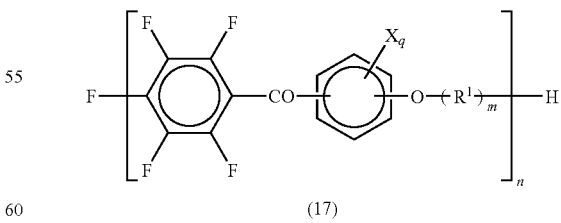

(16)

Furthermore, in the above formula (7), n represents a polymerization degree, and this polymerization degree ranges from 2 to 5000, preferably from 5 to 500. In addition, the polymerization may consist of repeat units having the same structure, or may consist of repeat units having different structures. In the latter case, the form of the polymerization of the repeat units may be block polymerization or may be random polymerization.

Further, it is preferred that an end of polyaryletherketone expressed by the above formula (7) is fluorine on the side of a p-tetrafluorobenzoylene group and a hydrogen atom on the side of an oxyalkylene group. Such polyaryletherketone can be expressed by, for example, the following general formula (17). Further, in the following formula (17), n represents the same polymerization degree as in the formula (7).

[chemical formula 17]

(17)

Specific examples of polyaryletherketone expressed by the above formula (7) include compounds having a repeat unit expressed by the following formulas (18) to (21), wherein n represents the same polymerization degree as in the above formula (7).

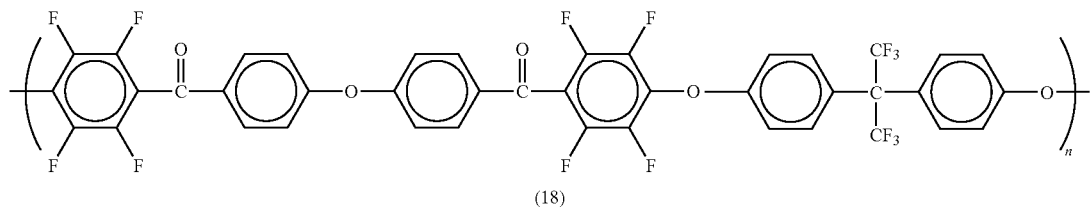

(18)

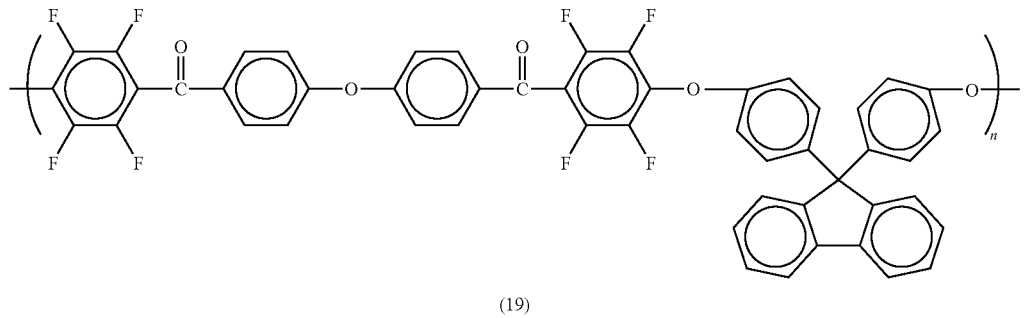

(19)

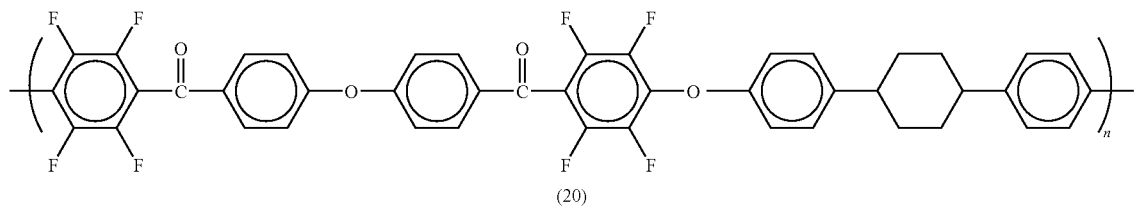

(20)

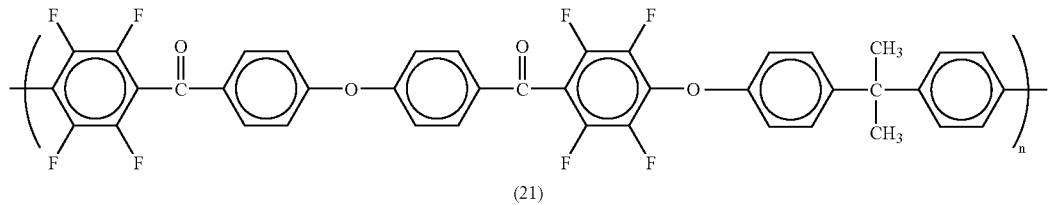

(21)

In addition to these compounds, examples of the foregoing polyamide or polyester, which is a material for forming an optical compensation plate, include polyamide and polyester described in Japanese Unexamined Patent Publication No. 10-508048. A repeat unit of the polyamide and polyester can be expressed, for example, by the following general formula (22):

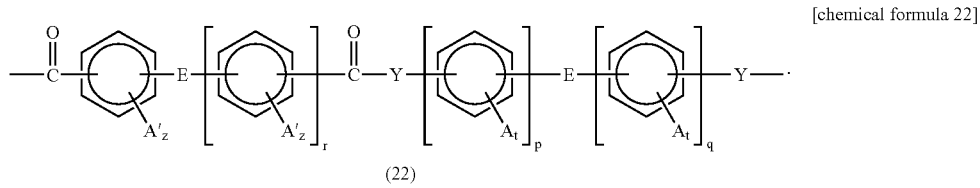

(22)

In the formula (22), each of Ys is O or NH. In addition, each of Es is, for example, at least a group selected from the group consisting of a covalent bond, a $C_2$ alkylene group, a halogenated $C_2$ alkylene group, a $CH_2$ group, a $C(CX_3)_2$ group (X is halogen or hydrogen), a CO group, an oxygen (O) atom, a sulfur (S) atom, an $SO_2$ group, an $Si(R)_2$ group and an $N(R)$ group, and these groups E may be the same or different. In the foregoing groups E, R is at least one species of a $C_1$ to $C_3$ alkyl group and a $C_1$ to $C_3$ halogenated alkyl group and is positioned at a meta position or a para position with respect to a carbonyl functional group or a group Y.

In addition, in the formula (22), each of A and A' is a substituent and their subscripts t and z represent the number of the substituents. In addition, p is an integer of 0 to 3, q is an integer of 1 to 3, and r is an integer of 0 to 3.

The foregoing A is selected from the group consisting of, for example, hydrogen, halogen, a $C_1$ to $C_3$ alkyl group, a $C_1$ to $C_3$ halogenated alkyl group, an alkoxy group denoted by OR (here, R is at least one species of a $C_1$ to $C_3$ alkyl group and a $C_1$ to $C_3$ halogenated alkyl group and is positioned at a meta position or a para position with respect to a carbonyl functional group or a group Y), an aryl group, a substituted aryl group by halogenation or the like, a $C_1$ to $C_9$ alkoxycarbonyl group, a $C_1$ to $C_9$ alkylcarbonyloxy group, a $C_1$ to $C_{12}$ aryloxycarbonyl group, a $C_1$ to $C_{12}$ arylcarbonyloxy group and a substituted derivative thereof, a $C_1$ to $C_{12}$ arylcarbamoyl group, a $C_1$ to $C_{12}$ arylcarbonylamino group and a substituted derivative thereof. When number of the foregoing As is two or more, these As are the same or different. The foregoing A' is selected from the group consisting of, for example, halogen, a $C_1$ to $C_3$ alkyl group, a $C_1$ to $C_3$ halogenated alkyl group, a phenyl group and a substituted phenyl group, and when number of the foregoing A's is two or more, these A's are the same or different. Examples of a substituent of the foregoing substituted phenyl group include halogen, a $C_1$ to $C_3$ alkyl group, a $C_1$ to $C_3$ halogenated alkyl group and combinations thereof. The foregoing subscript t is an integer of 0 to 4 and the foregoing subscript z is an integer of 0 to 3.

Among the repeat units of polyamide or polyester, expressed by the formula (22), a repeat unit expressed by the following general formula (23) is preferred.

[chemical formula 23]

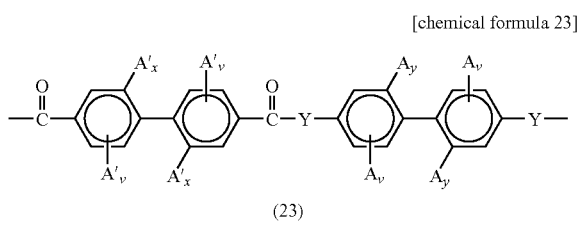

(23)

In the formula (23), A, A' and Y are identical to those of the foregoing formula (22), and the subscript v is an integer of 0 to 3, preferably an integer of 0 to 2. The subscripts x and y are 0 or 1, respectively (however, x and y are not simultaneously 0).

The above-mentioned optical compensation plate is generally formed on an appropriate substrate.

The substrate is not particularly limited, but substrate films having excellent transparency which can be used as a protective film of a polarizer are preferred. Further, as the substrate film, films containing a thermoplastic resin are preferred since these films are suitable for a stretching treatment or a shrinkage treatment. Specific examples of the substrate film include acetate resins such as triacetyl cellulose (TAC), polyester resins, polyethersulfone resins, polysulfone resins, polycarbonate resins, polyamide resins, polyimide resins, polyolefin resins, acrylic resins, polynorbornene resins, cellulose resins, polyarylate resins, polystyrene resins, polyvinyl alcohol resins, polyvinyl chloride resins, polyvinylidene chloride resins, polyacrylic resins, mixtures thereof and the like. Also, liquid crystal polymers can be used. Further, as described in, for example, Japanese Unexamined Patent Publication No. 2001-343529, a mixture of a thermoplastic resin having a substituted imide group or a non-substituted imide group on the side chain and a thermoplastic resin having a substituted phenyl group or a non-substituted phenyl group and a nitrile group on the side chain can also be used. Specific examples of this mixture include a resin composition having an alternating copolymer consisting of isobutene and N-methylenemaleimide, and an acrylonitrile-styrene copolymer. Among these, a material, which can set the birefringence obtained, for example, in forming a transparent film, at a relatively lower level, is preferred, and specifically, the above-mentioned mixture of a thermoplastic resin having a substituted imide group or a non-substituted imide group on the side chain and a thermoplastic resin having a substituted phenyl group or a non-substituted phenyl group and a nitrile group on the side chain is preferred. A thickness of the substrate film can be appropriately determined, but it is preferably about 5 to 300 µm, and more preferably in the range of 5 to 150 µm.

In addition, preferably, the foregoing substrate film would not be, for example, colored. Specifically, the retardation Rth in a thickness direction of the film expressed by the following equation: $Rth=[(nx+ny)/2-nz] \cdot d$, is preferably in a range of −90 nm to +75 nm, more preferably in a range of −80 nm to +60 nm, and particularly preferably in a range of −70 nm to +45 nm. When the retardation in a thickness direction is in a range of −90 nm to +75 nm, coloring (optical coloring) resulting from a film can be resolved. However, nx and ny represent the refractive indexes in the directions orthogonal to each other in a plane of the substrate film, and nz represents the refractive index in a thickness direction, and d represents a thickness (nm).

Since the substrate film can be used as a protective film of a polarizer, it is also preferred to use acetate resins such as triacetyl cellulose (TAC) or norbornene resins. The optical film obtained by forming the optical compensation plate directly on this substrate film can constitute a polarizing plate when a polarizer is laminated on the optical film.

Next, a production method of the optical compensation plate, a thickness of which does not have a uniform distribution, of the present invention will be described.

The optical compensation plate of the present invention is not particularly limited in the production method thereof as long as it can be formed in such a way that a layer thickness becomes thin toward a central portion, and for example, the optical compensation plate can be prepared by applying a material for forming an optical compensation plate onto an appropriate substrate while controlling an applied thickness. The material for forming an optical compensation plate is not particularly limited as long as it is a birefringent material exhibiting a birefringent property after forming the optical compensation plate, and non-liquid crystal polymers such as polyimide, described above in detail, can be employed, but in addition a liquid crystal polymer can also be employed.

Incidentally, specific control techniques of the applied thickness will be described later.

As the substrate, the above-mentioned substrate film is preferably used. By applying the birefringent material directly onto such substrate film, an optical film in which the optical compensation plate is directly laminated on the substrate film to become the protective film of the polarizer can be obtained.

A method of applying the birefringent material for forming the optical compensation plate onto the substrate film is not particularly limited. Examples of the method of applying include a method of heating and melting a birefringent material (for example, non-liquid crystal polymer such as polyimide) to apply this material, and a method of preparing a birefringent material in solution form for application. Among others, a method of applying a polymer solution formed by dissolving the above-mentioned non-liquid crystal polymer as a birefringent material in a solvent is preferred because of excellent workability.

A polymer concentration in the above-mentioned polymer solution is not particularly limited, but the concentration of the non-liquid crystal polymer is preferably 5 to 50 parts by weight, and more preferably 10 to 40 parts by weight with respect to 100 parts by weight of the solvent since the polymer solution of this concentration has a viscosity which is superior in an applying property. In addition, when applying the polymer solution with a die coater described later, as the polymer concentration in the polymer solution, the concentration of the non-liquid crystal polymer is preferably 10 to 35 parts by weight, and more preferably 10 to 25 parts by weight with respect to 100 parts by weight of the solvent.

The viscosity of the polymer solution is preferably 100 to 2000 mPa·sec, more preferably 200 to 1800 mPa·sec, and particularly preferably 500 to 1500 mPa·sec. When the polymer solution, in which the viscosity is adjusted to a range of 100 to 2000 mPa·sec, is used, a defect of appearance due to the fluidization of the solution during the time between the completion of applying and the drying step can be further inhibited and it is possible to prevent air bubbles from penetrating into the optical compensation plate to be obtained.

The solvent of the polymer solution is not particularly limited as long as it can dissolve a birefringent material such as a non-liquid crystal polymer, and it can be appropriately determined in accordance with the species of the birefringent material. Specific examples of the solvent include halogenated hydrocarbons such as chloroform, dichloromethane, carbon tetrachloride, dichloroethane, tetrachloroethane, trichloroethylene, tetrachloroethylene, chlorobenzene and o-dichlorobenzene; phenols such as phenol and p-chlorophenol; aromatic hydrocarbons such as benzene, toluene, xylene, methoxybenzene and 1,2-dimethoxybenzene; ketone solvents such as acetone, methyl ethyl ketone, methyl isobutyl ketone, cyclohexanone, cyclopentanone, 2-pyrrolidone and N-methyl-2-pyrrolidone; ester solvents such as ethyl acetate and butyl acetate; alcohol solvents such as t-butyl alcohol, glycerin, ethylene glycol, triethylene glycol, ethylene glycol monomethyl ether, diethylene glycol dimethyl ether, propylene glycol, dipropylene glycol and 2-methyl-2,4-pentanediol; amide solvents such as dimethylformamide and dimethylacetamide; nitrile solvents such as acetonitrile and butyronitrile; ether solvents such as diethyl ether, dibutyl ether and tetrahydrofuran; carbon disulfide; ethyl cellosolve, butyl cellosolve; and the like. These solvents may be used singly or in combination of two or more species. In addition, in the present invention, methyl isobutyl ketone is particularly preferred since it has a high dissolving property for the non-liquid crystal polymer and does not corrode the substrate film.

The polymer solution may be further mixed with various additives such as a stabilizer, a plasticizer and metals as required.

In addition, the polymer solution may contain, for example, different another resin within the bounds of not significantly deteriorating an aligning property of a birefringent material. Examples of the another resin include various general purpose resins, engineering plastics, thermoplastic resins, and thermosetting resins.

Examples of the various general purpose resins include polyethylene (PE), polypropylene (PP), polystyrene (PS), polymethyl methacrylate (PMMA), an ABS resin and an AS resin. Examples of the engineering plastics include polyacetal (POM), polycarbonate (PC), polyamide (PA), polyethylene terephthalate (PET), and polybutylene terephthalate (PBT). Examples of the thermoplastic resins include polyphenylene sulfide (PPS), polyethersulfone (PES), polyketone (PK), polyimide (PI), polycyclohexane dimethanol terephthalate (PCT), polyarylate (PAR), and liquid crystal polymers (LCP). Examples of the thermosetting resins include epoxy resins and phenol novolac resins.

When the another resin is thus mixed in the polymer solution, an amount of the another resin to be mixed is, for example, 0 to 50% by weight with respect to the foregoing polymer material, and preferably 0 to 30% by weight.

A method of applying the above-mentioned polymer solution is not particularly limited as long as it is a method by which a thickness of an applied film can be controlled. Examples of the method of applying include a die coating method, and a gravure printing method, but it is preferred to coat by the die coating method since a thickness can be easily controlled. A thickness of an applied film can be easily adjusted by changing a pitch of a discharge port in accordance with the die coating method.

Figure 4:
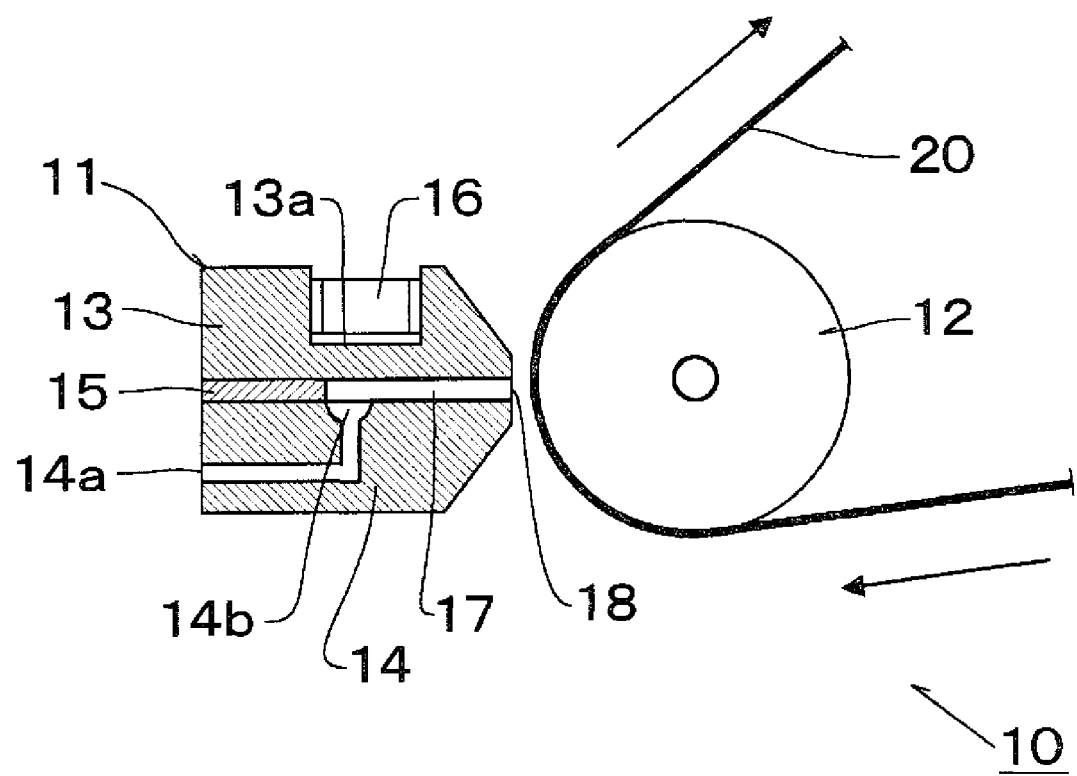
FIG. 4 is a side view, partially including a sectional view, showing an embodiment of a die coater apparatus used for producing the optical compensation plate.

An example of a die coater apparatus 10 used for producing the optical compensation plate of the present invention, which can adjust a thickness of an applied film, is shown in FIG. 4.

This die coater apparatus 10 includes a slot die 11 to discharge a material, and a rotating roller 12 to feed a long substrate film 20 (original film). The slot die 11 has a discharge port 18 in parallel with a rotation axis of the rotating roller 12, and is located at a position opposed to the rotating roller 12. The rotating roller 12 comprises a rotatable cylindrical body with a wider width than that of the long substrate film 20, and the long substrate film 20 is wound around the roller. The width of the substrate film 20 is not particularly limited, but a width matching the width of the liquid crystal cell to which the optical compensation plate of the present invention is attached is preferred. The width of the substrate film 20, for example, can be set about 600 mm to 1500 mm can be used.

Figure 5:
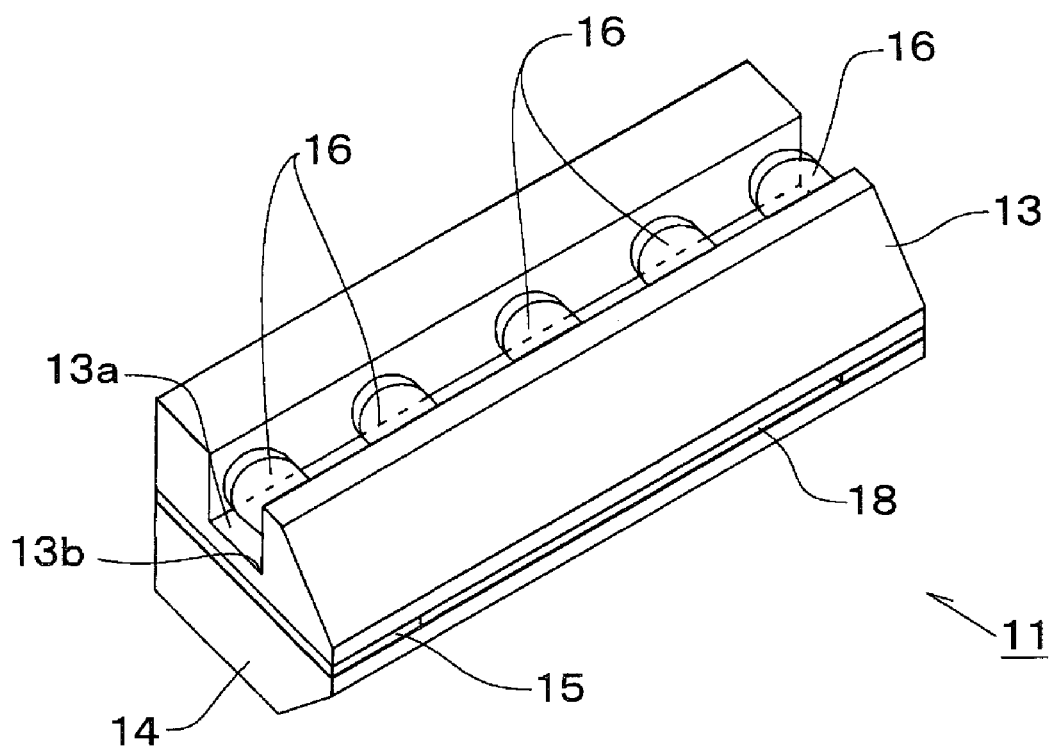
FIG. 5 is a perspective view showing an embodiment of a slot die of the die coater apparatus of FIG. 4.
Figure 6:
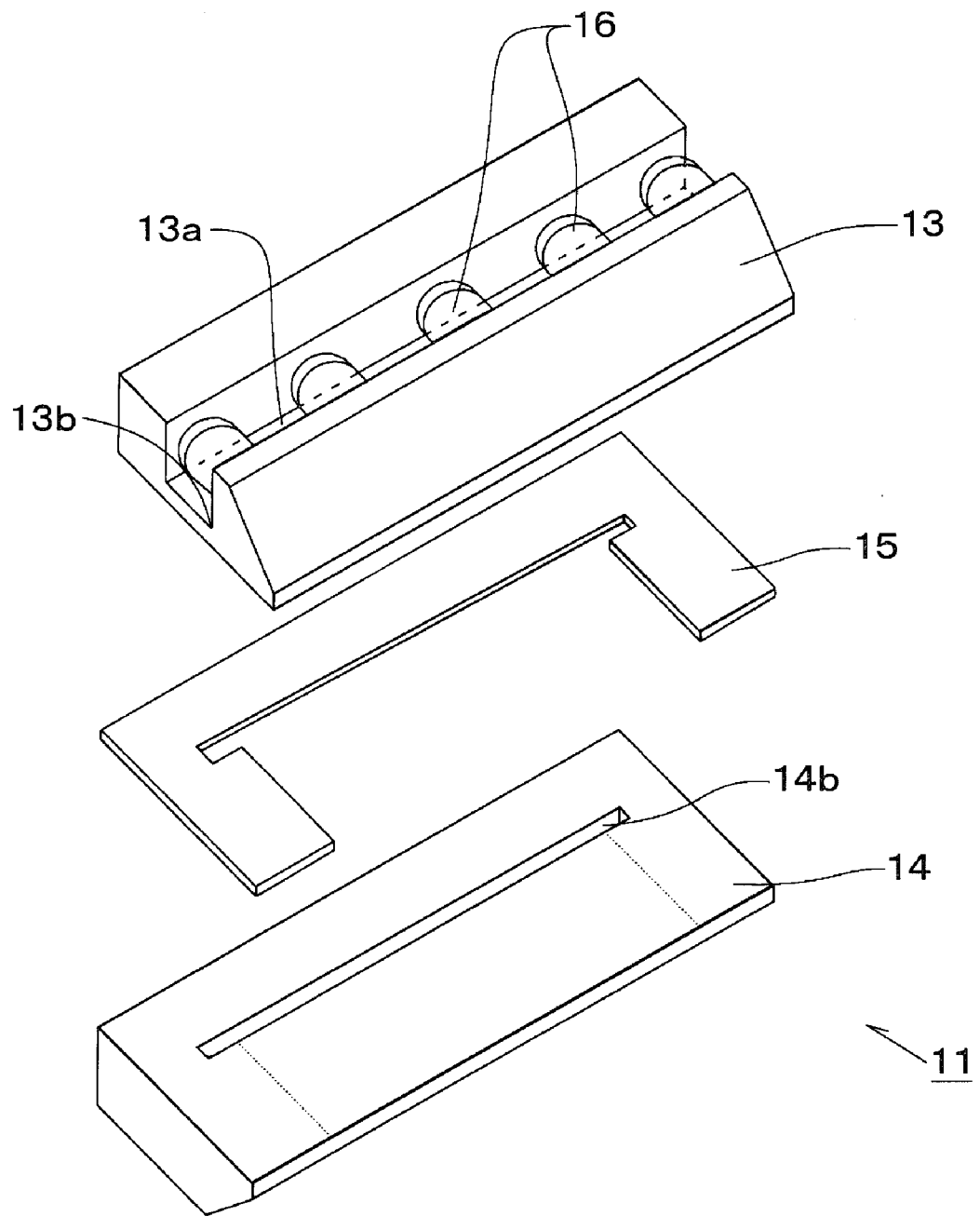
FIG. 6 is an exploded perspective view of the slot die of FIG. 5.

As shown in FIGS. 4 to 6, the slot die 11 includes a pair of upper and lower die bodies 13, 14 combined into one through a tightening tool (not shown) such as a bolt, and a shim 15 shaped like a letter U in a top view, interposed between the pair of upper and lower die bodies 13, 14.

A top face of the upper die body 13 is provided with a groove shaped like a letter U in a width direction. In the groove portion 13a, a plurality of actuators 16 are installed at prescribed pitches in the width direction. This actuator 16 can stretch in a direction orthogonal to the width direction of the die body 13, and it can be stretched and retracted using, for example, a cylinder driven hydraulically or by air pressure.

A feed opening 14a to feed the above-mentioned birefringent material (for example, the above-mentioned polymer solution formed by dissolving the non-liquid crystal polymer in a solvent) is formed at the backside of the lower die body 14. In addition, a manifold 14b in the form of a slit is opened in the inner face of the lower die body 14. This manifold 14b is communicated with the foregoing feed opening 14a, and opened in the form of a slit extending in the width direction.

Within the upper and lower die bodies 13, 14 combined into one with the shim 15 therebetween, a cavity 17 communicated with the manifold 14b is formed. The discharge port 18 corresponding a thickness of the shim 15, extending in the width direction, is formed in the front face of the pair of die bodies 13, 14.

In the above-mentioned slot die 11, a front portion of the upper die body 13 can be bent down around a corner 13b of the groove portion 13a as a fulcrum by stretching of the actuator 16. As a result of this, an opening distance (vertical clearance) of the discharge port 18 becomes small in response to the stretched actuator 16.

Figure 7A:
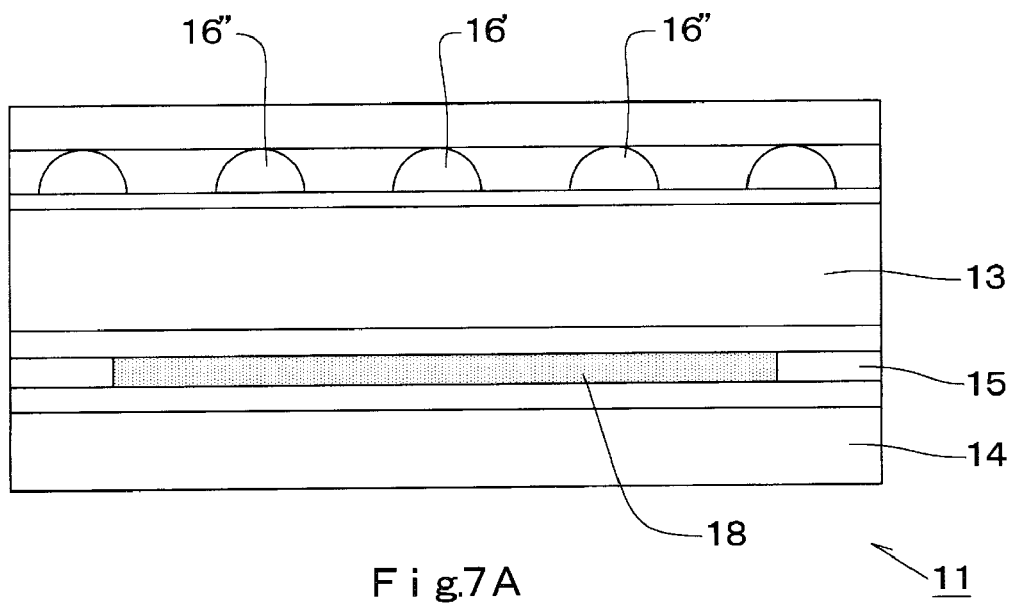
FIGS. 7A and 7B are oblique front views of the slot die of FIG. 5.
Figure 7B:
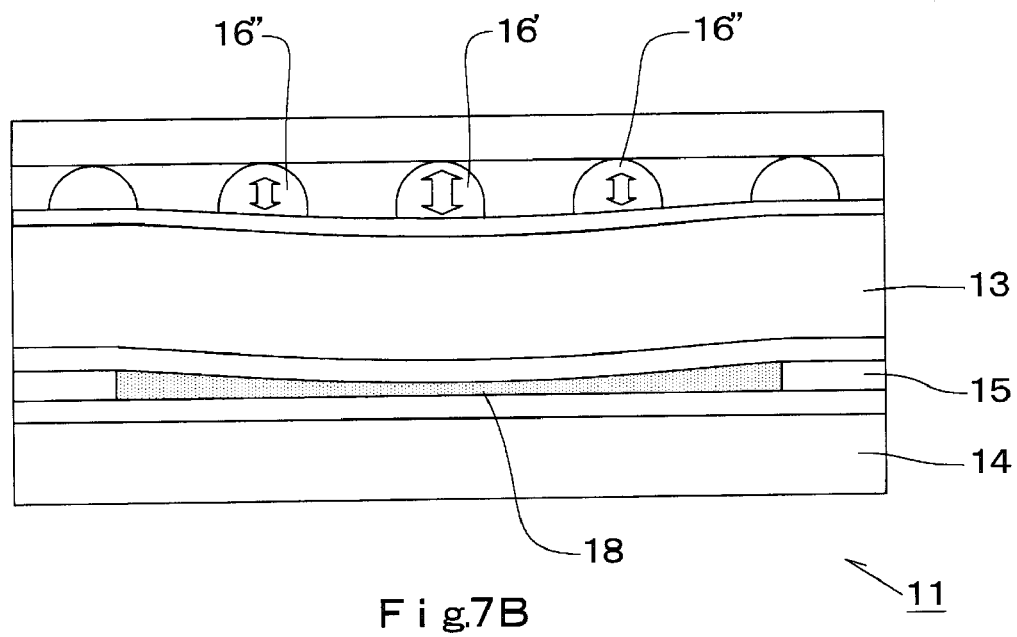

Therefore, as shown in FIG. 7B, by stretching the actuator 16' positioned at a central portion at the maximum stroke, and stretching the actuators 16" positioned at outer sides of the actuator 16' less than the actuator 16', a front end of the upper die body 13 can be deformed to a mild curve which is convex downward. Therefore, it is possible to adjust the opening distance of the discharge port 18 so as to become small gradually toward the central portion from both end portions in a lateral direction (in FIGS. 7A and 7B, the discharge port 18 is filled with tint black for convenience).

Figure 8:
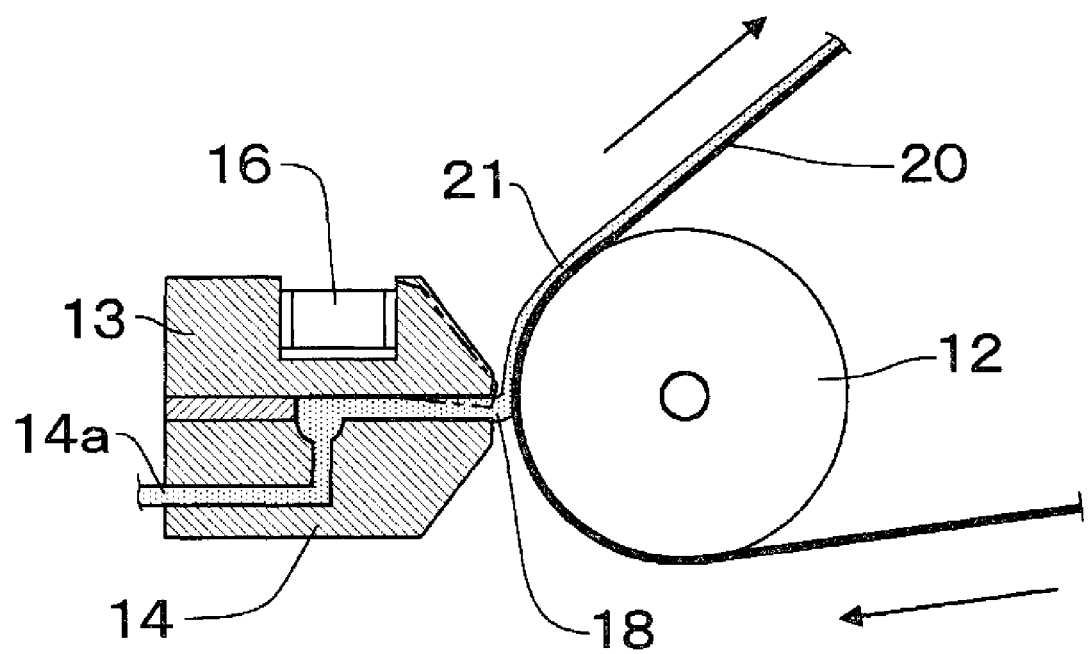
FIG. 8 is a side view, partially including a sectional view, showing a state of applying a material with the die coater apparatus of FIG. 4, in which an alternate long and short dash line shows a central portion of the die main body deformed by starting of the actuator.

The above-mentioned die coater apparatus 10 pushes a birefringent material 21 out from the discharge port 18 as shown in FIG. 8. The birefringent material 21 pushed out can be applied continuously to the long substrate film 20 fed by the roller 12 longitudinally to form an applied film on the substrate film 20. In forming the applied film, as described above, by appropriately extending each actuator 16 to adjust the opening distance of the discharge port 18 so as to become small toward the center, an applied film, which becomes thin gradually toward a central portion from both end portions in a lateral direction of the substrate film 20, can be produced.

If the above-mentioned die coater apparatus 10 is used, by appropriately adjusting the degree of extension of the actuator 16, it becomes possible to control the distribution of a thickness of the applied film easily and as desired.

Further, by placing more actuators 16, it becomes possible to adjust the opening distance of the discharge port 18 more finely.

Further, a running velocity (feeding velocity) of the long substrate film 20 and a pressure to discharge the birefringent material 21 are not particularly limited. Generally, when the substrate film 20 is fed fast, the birefringent material 21 can be applied thin as a whole.

As the specific running velocity (feeding velocity) of the substrate film 20, 10 to 300 m/min can be exemplified, further 10 to 100 m/min is preferred, and particularly 10 to 50 m/min is more preferred. The reason for this is that when the running velocity of the substrate film 20 is in a range of 10 to 300 m/min, the discharge of a solution from the discharge port 18 of the die is stable and an applied film (namely an optical compensation plate) excellent in thickness precision can be formed. However, even when the running velocity is changed, the applied film can be still formed in such a way that a thickness in the central portion in the width direction of the substrate film 20 is thinner than those in both ends portion.

A coefficient of variation of the running velocity of the substrate film 20 is preferably controlled so as to be 3.0% or less. By limiting the coefficient of variation of the running velocity to 3.0% or less, applying of the birefringent material to the substrate film 20 is stabilized, and an applied film without unevenness (projections or depressions in the form of a streak in a width direction are not produced) can be formed. Preferably, the lower limit of the above-mentioned coefficient of variation is theoretically 0%, but practically 0.5%, and more preferably 0.9%.

The coefficient of variation of the running velocity can be determined by running the substrate film continuously for 60 seconds using, for example, "Laser Speed System Model LS200" (manufactured by KANOMAX JAPAN, INC.), measuring a running velocity every 8 second, plotting each velocity in a table, determining the maximum value X1, the minimum value X2, an average AV of the running velocity from this table, and calculating the coefficient of variation from the following equation.

$$\text{Coefficient of variation} = \{[(X1-X2)/AV]/2\} \times 100$$

Figure 9A:
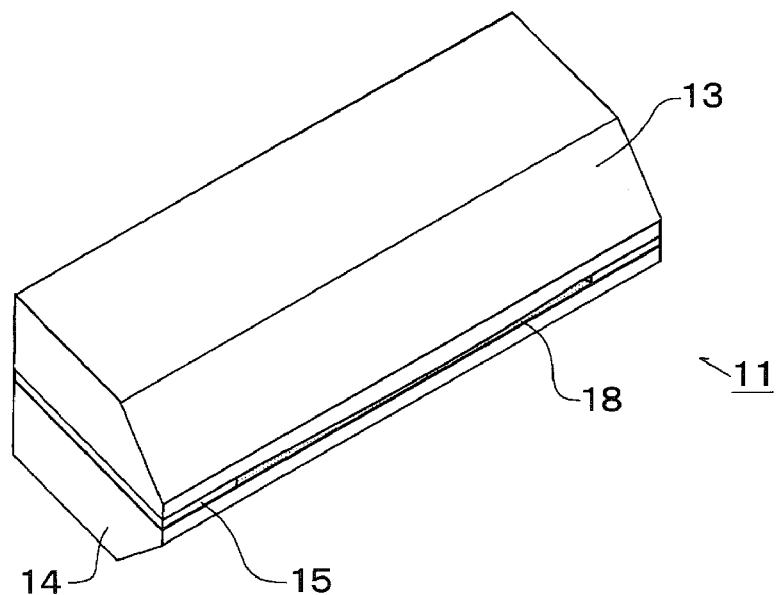
FIG. 9A is a perspective view thereof.
Figure 9B:
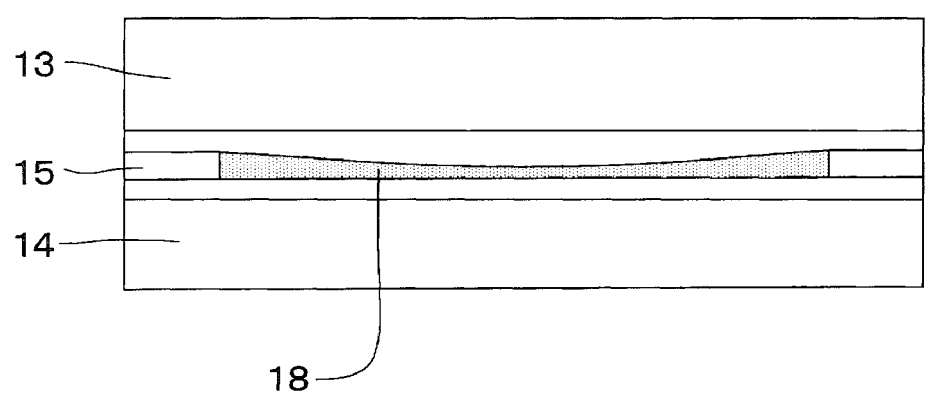
FIG. 9B is a front view thereof.

Next, FIGS. 9A and 9B show a variation example of the die coater apparatus.

In the slot die 11 of this variation example, the opening distance of the discharge port 18 is formed in advance so as to become small toward the central portion by grinding a bottom surface of a front portion of the upper die body 13 (and/or the lower die body 14) in the form of a side of a cylinder.

Also when the birefringent material is applied using a die coater apparatus provided with the slot die 11 of this variation example, it is possible to apply the birefringent material so as to become thin toward a central portion from both end portions in a lateral direction of the substrate film as with the above case.

In addition, although not shown, a die coater apparatus using a shim formed so as to become thin toward a central portion in a lateral direction, or a die coater apparatus in which the opening distance of the discharge port is controlled by adjusting a tightening force of the upper and the lower die bodies may be used. Also when such a die coater apparatus is used, it is possible to apply the birefringent material so as to become thin toward a central portion from both end portions in a lateral direction of the substrate film as with the above case.

Figure 10:
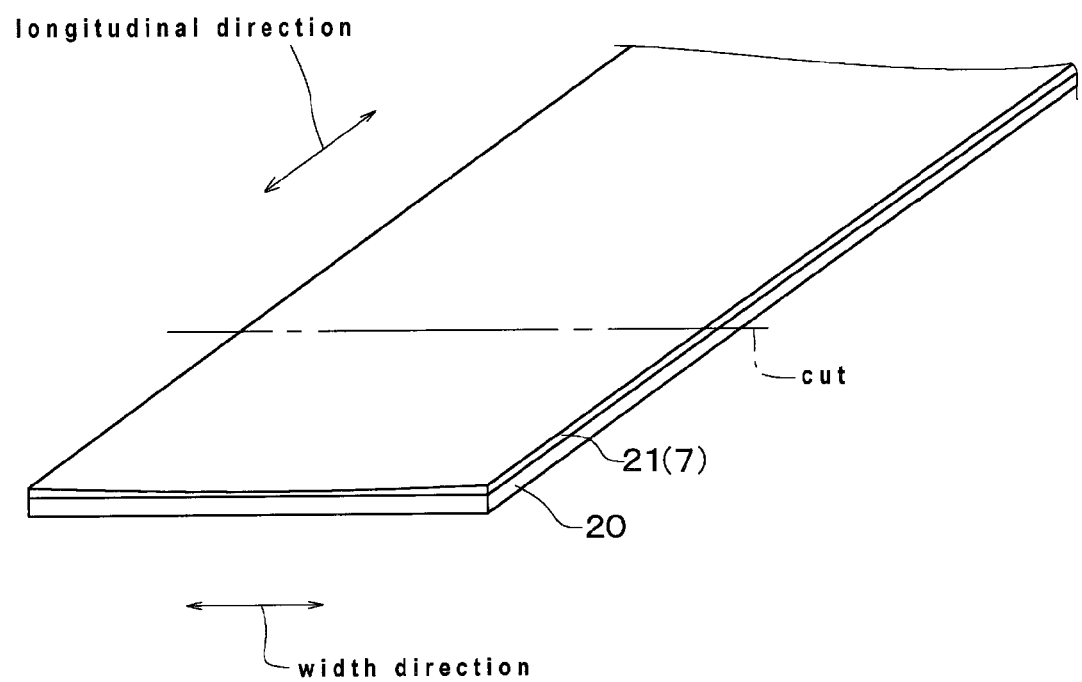
FIG. 10 is a partially simplified perspective view showing a cutting direction of a long substrate film on which the optical compensation plate is laminated.

An applied film, in which a thickness distribution is adjusted, is formed by following the above method, and then this applied film is dried. After drying, an optical film formed by laminating the optical compensation plate 7 of the present invention directly on the long substrate film 20 can be obtained. In addition, as shown in FIG. 10, by cutting this optical film in a width direction of the substrate film 20, a rectangular optical film can be obtained. In this rectangular optical film, the optical compensation plate 7 becomes thin toward a central portion from both end portions in a lateral direction (a width direction of the substrate film 20). The optical compensation plate 7 is bonded to a liquid crystal cell with the vertical and horizontal sides of the optical compensation plate aligned with those of the liquid crystal cell and used.

In addition, in the above-mentioned substrate film, transparent films such as a TAC film exemplified in the above description can be employed. As a film of this kind, a film having a shrinking property in one direction in a plane of a film as thermal properties is preferred. The reason for this is that by using such the substrate film, the optical compensation plate exhibiting the optically biaxial property can be readily produced.

Specifically, the above-mentioned non-liquid crystal polymer like polyimide exhibits an optical property of $nx \approx ny > nz$ by its nature regardless of the presence or absence of alignment of the substrate film. Therefore, an applied film containing the non-liquid crystal polymer exhibits an optically uniaxial property. That is, the applied film exhibits retardation only in a thickness direction. Herein, by using a film to shrink in one direction in a plane of a film as a substrate film, the applied film on the substrate film shrinks in the plane as the substrate film shrinks. Accordingly, difference of refraction in the plane is produced in the applied film, and the optical compensation plate exhibiting the optically biaxial property ($nx > ny > nz$) can be obtained.

The above-mentioned substrate film is preferably stretched in advance, for example, in any one direction in a plane of a film in order to have a shrinking property in one direction in the plane. By stretching the film in advance like this, a shrinking force is generated in a direction opposite to the foregoing direction of stretching. The difference between shrinkages in the plane of this substrate film is used to impart the difference between refractive indexes in the plane to the non-liquid crystal material of the applied film.

A thickness of a not-yet-stretched substrate film is not particularly limited, but the thickness is, for example, in a range of 10 to 200 μm, preferably in a range of 20 to 150 μm, and particularly preferably in a range of 30 to 100 μm. In addition, a stretch ratio is not particularly limited as long as the optical compensation plate formed on the shrunken substrate film falls within a range of exhibiting the optically biaxial property (nx>ny>nz).

The substrate film subjected to a stretching treatment is generally shrinks by heating. Accordingly, by applying a heating treatment to the applied film on the above-mentioned substrate film, the substrate film is shrunk. The applied film shrinks in association with this shrinkage of the substrate film, and thereby the optical compensation plate having the optically biaxial property can be formed. The conditions of the heating treatment are not particularly limited, and they can be appropriately determined according to the species of a material of the substrate film. Generally, a heating temperature is, for example, in a range of 25 to 300° C., preferably in a range of 50 to 200° C., and particularly preferably in a range of 60 to 180° C.

Optical properties of the optical compensation plate may varies with time in proportion to an amount of a solvent remaining in the optical compensation plate. Therefore, the amount of a solvent remaining in the optical compensation plate to be obtained is, for example, preferably 5% by weight or less, more preferably 2% by weight or less, and furthermore preferably 0.2% by weight or less.

As a method of forming the optical compensation plate exhibiting the optically biaxial property (nx>ny>nz) on the substrate film, the following method is also effective. That is, the above-mentioned birefringent material is applied directly onto the substrate film to form an applied film, and then the substrate film and the applied film are stretched together. This method does not use a shrinking force of the substrate film, but the optical compensation plate exhibiting the optically biaxial property (nx>ny>nz) can be formed directly on the substrate film on the same principle as in the above description even by this method.

The above-mentioned method of stretching the laminate of the substrate film and the applied film is not particularly limited. Examples of the stretching method include a method of stretching in a width direction with a tenter, a free-end longitudinal stretching method of uniaxially stretching in a longitudinal direction of the substrate film, a fixed-end transverse stretching method of uniaxially stretching in a width direction with the substrate film fixed in a longitudinal direction, and a biaxial stretching method of sequential or simultaneous stretching in both a longitudinal direction and a width direction. Preferably, by stretching the laminate in a width direction with a tenter method, and then shrinking it at a stretch ratio of 0.9 or more and less than 1 in a width direction, variations in an alignment axis (slow axis) can be made extremely small.

In addition, stretching of the laminate of the substrate film and the applied film may be performed, for example, by stretching both of the substrate film and the applied film, but it is preferred to stretch only the substrate film from the following reason. When stretching only the substrate film, the applied film is indirectly stretched due to tension produced in the substrate film by this stretching. In addition, generally, stretching of a single layer is more uniform than stretching of a laminate, and therefore by stretching uniformly only the substrate film, the applied film can also be uniformly stretched.

The conditions of stretching the laminate is not particularly limited, and they can be appropriately determined in accordance with, for example, species of the substrate film or the materials for forming the optical compensation plate. As a specific example, a stretch ratio is preferably more than 1 and 5 or less, more preferably more than 1 and 4 or less, and particularly preferably more than 1 and 3 or less.

The optical film (laminated body of the substrate film and the optical compensation plate) obtained by the above method satisfies the conditions of the following equations (I) to (III). Particularly, by satisfying the equation (I), it is possible to prevent rainbow irregularity (a phenomenon in which a screen is colored in multiple colors) posed when the optical film is located in a liquid crystal display device.

$$\Delta n(a) > \Delta n(b) \times 10 \qquad \text{Equation (I)}$$

$$1 < (nx-nz)/(nx-ny) \qquad \text{Equation (II)}$$

$$0.0005 \leq \Delta n(a) \leq 0.5 \qquad \text{Equation (III)}$$

In the equations (I) and (III), $\Delta n(a)$ is the birefringence of the optical compensation plate, and $\Delta n(b)$ is the birefringence of the substrate film, and these are expressed by the following equations, respectively. In the equation (II) and the following equation, nx, ny, and nz represent the refractive indexes in the directions of an X-axis, a Y-axis and a Z-axis, respectively, in the optical compensation plate and nx', ny', and nz' represent the refractive indexes in the directions of an X-axis, a Y-axis and a Z-axis, respectively, in the substrate film, and the X-axis is an axial direction in which the maximum refractive index is shown in planes of the compensation plate and the substrate film, the Y-axis is an axial direction perpendicular to the X-axis in the foregoing planes, and the Z-axis represents a thickness direction perpendicular to the X-axis and the Y-axis.

$$\Delta n(a) = [(nx+ny)/2] - nz$$

$$\Delta n(b) = [(nx'+ny')/2] - nz'$$

Further, the optical film prepared by laminating the optical compensation plate on the substrate film preferably has at least one of an adhesive layer and a pressure sensitive adhesive layer. The reason for this is that by providing the adhesive layer or the like, bonding of the optical film and other optical members such as a polarizer or other members such as a liquid crystal cell becomes easy. Therefore, the adhesive layer or the pressure sensitive adhesive layer is preferably provided on the outermost face of the optical film. Further, the adhesive layer or the pressure sensitive adhesive layer may be provided on the outermost one side or on the outermost both sides of the optical film.

A material of the pressure sensitive adhesive layer (or the adhesive layer) is not particularly limited, and for example, polymer based pressure sensitive adhesives such as acrylic, vinyl alcohol, silicone, polyester, polyurethane, and polyether pressure sensitive adhesives, rubber pressure sensitive adhesives, other pressure sensitive adhesives, and adhesives can be used. In addition, by including fine particles in these materials, a layer exhibiting a light diffusing property may be formed. As the pressure sensitive adhesive or the adhesive, materials having, for example, excellent hygroscopicity or excellent heat resistance are preferred. When such materials are used for, for example, a liquid crystal display device, it is possible to prevent foaming or peeling due to absorption of moisture, deterioration of optical properties due to the difference in thermal expansions, and warp of the liquid crystal cell. Accordingly, a liquid crystal display device of high quality, having excellent durability, can be provided.

The optical compensation plate or the optical film of the present invention may be used alone. In addition, as required, the optical compensation plate or the optical film can be combined with other optical members such as a polarizer to be formed into a laminate and used for various optical applications.

For example, since the above-mentioned optical film has a substrate film and an optical compensation plate, by laminating a polarizer on this substrate film or optical compensation plate, it is possible to configure an elliptical polarizing plate. However, since the substrate film can also be used as a protective film of a polarizer, by laminating the polarizer on the surface of the substrate film, a low-profile polarizing plate can be favorably formed.

A material of the polarizer is not particularly limited, and conventionally known materials can be used. The polarizer prepared, for example, by allowing various films to adsorb iodine or a dichroic material such as a dichroic dye to dye the films and crosslinking/stretching/drying the dyed films can be used. Among these, a polarizer having a film, which transmits linearly polarized light when natural light enters, is preferred, and a polarizer which is superior in light transmittance and a degree of polarization is particularly preferred. Examples of a film for adsorbing the foregoing dichroic material include hydrophilic polymer films such as polyvinyl alcohol (PVA) films, partially formalized PVA films, ethylene-vinyl acetate copolymer based partially saponified films and cellulose films. In addition to these, as the film, for example, aligned polyene films such as a dehydration product of PVA and a dehydrochlorination product of polyvinyl chloride can also be used. Among these, PVA films are preferred. Further, a thickness of the foregoing polarizer is generally 1 to 80 μm, but the thickness is not limited to this.

The optical compensation plate and the optical film of the present invention can be used in combination with conventionally known optical members such as various retardation plates, a diffusion control film, and a brightness enhancing film in addition to the above-mentioned polarizers. Examples of the retardation plates include films formed by uniaxially stretching or biaxially stretching a polymer film, by aligning a polymer film in a Z-axis direction, and an applied film of a liquid crystal polymer. Examples of the diffusion control film include films using diffusing, scattering, and refraction. The diffusion control film can be used for controlling a viewing angle, glare concerning resolution, and scattered light. As the brightness enhancing film, a brightness enhancing film using selective reflection of cholesteric liquid crystal and a quarter-wave plate (λ/4 plate) or a scattering film using anisotropic scattering by polarization direction can be used.

A method of laminating other optical members on the optical compensation plate and the optical film of the present invention is not particularly limited, and lamination can be performed by conventionally known methods. Generally, the same pressure sensitive adhesives and adhesives as those described above can be used, and their species can be appropriately determined based on each material. Examples of the adhesives include polymer based adhesives such as acrylic, vinyl alcohol, silicone, polyester, polyurethane, and polyether adhesives, and rubber adhesives. In addition, adhesives comprising water-soluble crosslinking agents for vinyl alcohol polymers such as glutaraldehyde, melamine and oxalic acid can also be used. The above-mentioned pressure sensitive adhesive and adhesive are hard-to-peel, for example, even by effects of humidity or heat, and are superior in light transmittance and a degree of polarization. Specifically, when the polarizer is a PVA film, it is preferred to use a PVA adhesive from the viewpoint of stability of a bonding treatment. These pressure sensitive adhesives and adhesives may be applied, for example, directly to the surface of the polarizer or the substrate film, or a layer such as a tape or a sheet composed of the foregoing adhesives or pressure sensitive adhesives may be located on the foregoing surface. A thickness of such adhesive layer is not particularly limited, but the thickness is, for example, 1 nm to 500 nm, preferably 10 nm to 300 nm, more preferably 20 nm to 100 nm.

It is also possible to impart ultraviolet absorbing power to the optical compensation plate and the optical film of the present invention described above and other optical members laminated thereon. As means for imparting ultraviolet absorbing power, it can be exemplified that ultraviolet absorbers such as salicylic acid ester compounds, benzophenone compounds, benzotriazole compounds, cyanoacrylate compounds, and nickel complex salt compounds is appropriately treated.

As described above, the optical compensation plate and the optical film of the present invention can be located on one side or both sides of the liquid crystal cell to be used for forming the liquid crystal display device to be used as a form of a liquid crystal panel. The liquid crystal panel can be used for reflective, semi-transmissive, or transmissive-reflective liquid crystal display devices.

A type of a liquid crystal cell forming the liquid crystal display device can be arbitrarily selected. Liquid crystal cells of various types such as an active matrix drive type typified by a thin-film transistor type and a simple matrix drive type typified by a twisted nematic type and a super twisted nematic type can be used. Among these, since the optical compensation plate of the present invention is particularly superior in optical compensation of a VA (vertical alignment) cell, it is very useful as a viewing angle compensating film for a VA mode liquid crystal display device.

In addition, when the above-mentioned optical compensation plate, optical film, and polarizer are provided on both sides of the liquid crystal cell, these may be the same or may be different. Furthermore, in forming the liquid crystal display device, adequate parts such as a prism array sheet, a lens array sheet, a light diffuser and a backlight can be located in one layer or two or more layers at adequate positions.

Furthermore, when the liquid crystal display device of the present invention includes a light source such as a backlight, the light source is preferably a plane light source emitting, for example, polarized light because optical energy can be effectively used.

What is claimed is:

1. An optical compensation plate provided on a liquid crystal cell, comprising:
   a liquid crystal layer formed between a pair of liquid crystal cell substrates; and
   spacers interposed between said liquid crystal cell substrates for holding a gap in said liquid crystal layer, said optical compensation plate is provided on an outer surface side of said liquid crystal layer,
   wherein said optical compensation plate has a portion in which a layer thickness becomes thin gradually toward a central portion from both end portions in a lateral direction thereby improving the viewing angle.

2. The optical compensation plate according to claim 1, wherein said optical compensation plate is formed into a rectangular shape.

3. The optical compensation plate according to claim 1, wherein the spacers are composed of a fine particle which can move in the liquid crystal layer.

4. The optical compensation plate according to claim 1, exhibiting a relationship of $nx > ny > nz$, wherein nx, ny, and nz represent refractive indexes in the direction of an X-axis, a Y-axis and a Z-axis, respectively, and the X-axis is an axial direction in which the maximum refractive index is shown in a plane, the Y-axis is an axial direction perpendicular to the X-axis in the same plane, and the Z-axis represents a thickness direction perpendicular to the X-axis and the Y-axis.

5. The optical compensation plate according to claim 1, wherein said optical compensation plate is obtained by applying a long substrate film successively with a birefringent material.

6. The optical compensation plate according to claim 5, wherein a width of the long substrate film is 600 to 1500 mm, and said optical compensation plate is obtained by applying the birefringent material, and then cutting the long substrate film in a width direction.

7. The optical compensation plate according to claim 5, wherein the birefringent material is a polymer solution including at least one species of polymer selected from polyamide, polyimide, polyester, polyetherketone, polyamide-imide and polyesterimide, and a solvent.

8. The optical compensation plate according to claim 5, wherein the substrate film is a protective film of a polarizer.

9. A liquid crystal cell having the optical compensation plate according to claim 1.

10. The liquid crystal cell according to claim 9, wherein said liquid crystal cell is in a VA (vertical alignment) mode.

11. A liquid crystal display device having the liquid crystal cell according to claim 9.

* * * * *